(12) United States Patent
Horning et al.

(10) Patent No.: US 11,512,694 B2
(45) Date of Patent: Nov. 29, 2022

(54) PISTON ROD ASSEMBLY FOR A FLUID PUMP

(71) Applicant: Graco Minnesota Inc., Minneapolis, MN (US)

(72) Inventors: Jeromy D. Horning, Albertville, MN (US); Steve J. Wrobel, Rogers, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 17/226,615

(22) Filed: Apr. 9, 2021

(65) Prior Publication Data

US 2021/0231121 A1 Jul. 29, 2021

Related U.S. Application Data

(63) Continuation of application No. 16/688,621, filed on Nov. 19, 2019, now Pat. No. 11,002,271, which is a
(Continued)

(51) Int. Cl.
*F04B 53/14* (2006.01)
*F04B 19/22* (2006.01)
(Continued)

(52) U.S. Cl.
CPC .......... *F04B 53/146* (2013.01); *F04B 1/0408* (2013.01); *F04B 19/22* (2013.01); *F04B 53/147* (2013.01); *F16J 7/00* (2013.01)

(58) Field of Classification Search
CPC ...... F04B 53/16; F04B 1/0408; F04B 53/147; F04B 19/22; F16J 7/00
See application file for complete search history.

(56) References Cited

U.S. PATENT DOCUMENTS

| | | | |
|---|---|---|---|
| 1,060,351 A | 4/1913 | Molloy et al. | |
| 1,865,350 A | 6/1932 | William | |

(Continued)

FOREIGN PATENT DOCUMENTS

| | | | |
|---|---|---|---|
| CN | 87202952 U | 3/1988 | |
| CN | 1131235 A | 9/1996 | |

(Continued)

OTHER PUBLICATIONS

Communication Pursuant to Article 94(3) EPC for EP Application No. 20163489.6, dated Apr. 19, 2021, pp. 4.
(Continued)

*Primary Examiner* — Thomas E Lazo
(74) *Attorney, Agent, or Firm* — Kinney & Lange, P. A.

(57) ABSTRACT

A piston includes a piston cap, a piston rod body, and a piston head, with the piston cap being removable from the piston rod body. The piston cap includes a cap body and a connecting portion extending from the cap body and away from the piston rod body. The connecting portion includes a neck and a cap head with the cap head connected to an end of the neck disposed opposite the piston rod body. The cap head is wider than the neck. A mounting portion of the piston rod body extends into a receiving portion of the cap body to connect the piston rod body to the piston cap.

18 Claims, 11 Drawing Sheets

Related U.S. Application Data continuation of application No. 15/901,404, filed on Feb. 21, 2018, now Pat. No. 10,514,030.

(60) Provisional application No. 62/461,575, filed on Feb. 21, 2017.

(51) Int. Cl.
*F16J 7/00* (2006.01)
*F04B 1/0408* (2020.01)

(56) References Cited

U.S. PATENT DOCUMENTS

| | | | |
|---|---|---|---|
| 2,274,927 A * | 3/1942 | Lankford | F16J 7/00 403/25 |
| 2,286,263 A | 6/1942 | Comins | |
| 2,464,936 A | 3/1949 | McConaghy | |
| 2,737,817 A | 3/1956 | Harris et al. | |
| 2,821,404 A | 1/1958 | Sloan | |
| 2,844,103 A | 7/1958 | Allen | |
| 3,015,529 A | 1/1962 | Hardcastle | |
| 3,279,376 A | 10/1966 | Hart | |
| 3,414,302 A | 12/1968 | Priest | |
| 3,501,180 A | 3/1970 | Waara | |
| 3,502,028 A | 3/1970 | Cooper | |
| 3,670,630 A | 6/1972 | Tyson et al. | |
| 3,814,086 A | 6/1974 | Lemb | |
| 3,857,642 A | 12/1974 | Miller | |
| 3,967,542 A | 7/1976 | Hall et al. | |
| 4,044,655 A | 8/1977 | Kennicott | |
| 4,060,351 A | 11/1977 | Cloup | |
| 4,208,953 A | 6/1980 | Prusic | |
| 4,348,159 A | 9/1982 | Acheson | |
| 4,500,267 A | 2/1985 | Birdwell | |
| 4,511,276 A | 4/1985 | Doutt | |
| 4,541,783 A | 9/1985 | Walling | |
| 4,568,249 A | 2/1986 | Todd | |
| 4,635,621 A | 1/1987 | Atkinson | |
| 4,637,193 A | 1/1987 | Lange | |
| 4,681,516 A | 7/1987 | Ohara et al. | |
| 4,696,211 A | 9/1987 | Bitzel | |
| 4,749,300 A | 6/1988 | Berger et al. | |
| 4,897,996 A | 2/1990 | Hagin et al. | |
| 5,002,468 A | 3/1991 | Murata et al. | |
| 5,032,349 A | 7/1991 | Brandes et al. | |
| 5,061,077 A | 10/1991 | Whiteman | |
| 5,067,882 A | 11/1991 | Devries et al. | |
| 5,122,032 A | 6/1992 | Shields et al. | |
| 5,135,329 A | 8/1992 | Yuda | |
| 5,205,655 A * | 4/1993 | Sato | F16B 9/09 403/26 |
| 5,211,611 A * | 5/1993 | Lammers | F04B 9/04 475/178 |
| 5,253,981 A | 10/1993 | Yang et al. | |
| 5,346,037 A | 9/1994 | Flaig et al. | |
| 5,407,292 A | 4/1995 | Collins | |
| 5,413,031 A | 5/1995 | Kohlmeyer | |
| 5,440,282 A | 8/1995 | Devendorf et al. | |
| 5,509,766 A | 4/1996 | Leuschner | |
| 5,513,962 A | 5/1996 | Easton | |
| 5,525,515 A | 6/1996 | Blattner | |
| 5,533,488 A | 7/1996 | Cook et al. | |
| 5,586,480 A | 12/1996 | Gardner | |
| 5,609,646 A | 3/1997 | Field et al. | |
| 5,711,709 A | 1/1998 | McCoy | |
| D390,923 S | 2/1998 | Stevens | |
| 5,740,718 A | 4/1998 | Rathweg | |
| 5,984,646 A * | 11/1999 | Renfro | B05B 9/0409 417/375 |
| 6,015,268 A | 1/2000 | Hetherington | |
| 6,032,349 A | 3/2000 | Wagner et al. | |
| 6,183,225 B1 | 2/2001 | Thompson | |
| 6,212,998 B1 | 4/2001 | Thompson et al. | |
| 6,428,287 B1 | 8/2002 | Denkins et al. | |
| 6,533,488 B2 | 3/2003 | Blenkush et al. | |
| 6,609,646 B2 | 8/2003 | Miller et al. | |
| 6,752,067 B1 * | 6/2004 | Davidson | F04B 53/20 417/415 |
| 6,764,284 B2 | 7/2004 | Oehman | |
| 6,994,500 B2 | 2/2006 | Ward et al. | |
| 7,036,752 B1 | 5/2006 | Hsiang | |
| 7,112,025 B2 | 9/2006 | Ward et al. | |
| 7,373,870 B2 | 5/2008 | Epshteyn | |
| 7,444,923 B2 * | 11/2008 | Horning | F04B 53/164 92/182 |
| 7,448,857 B1 | 11/2008 | Fugere | |
| 7,568,874 B2 | 8/2009 | Riedel et al. | |
| 7,918,654 B2 | 4/2011 | Adahan | |
| 8,167,583 B2 | 5/2012 | Harnetiaux et al. | |
| 8,177,524 B1 | 5/2012 | Kieffer et al. | |
| 8,382,459 B2 | 2/2013 | Schuller et al. | |
| 8,581,866 B2 | 11/2013 | Park et al. | |
| 8,602,751 B2 | 12/2013 | Courier | |
| 8,632,316 B2 | 1/2014 | Headley | |
| 8,632,317 B2 | 1/2014 | Headley | |
| 8,696,330 B2 | 4/2014 | Ohligschlaeger et al. | |
| 9,003,950 B2 | 4/2015 | Headley | |
| 9,068,567 B2 | 6/2015 | Hitter et al. | |
| 9,540,971 B2 * | 1/2017 | Bauck | F04B 9/12 |
| 10,077,771 B2 | 9/2018 | Davidson et al. | |
| 10,337,614 B2 | 7/2019 | Horning et al. | |
| 10,514,030 B2 | 12/2019 | Horning et al. | |
| 2001/0029838 A1 | 10/2001 | Blenkush et al. | |
| 2002/0079016 A1 | 6/2002 | Webb | |
| 2002/0176788 A1 | 11/2002 | Moutafis et al. | |
| 2003/0161746 A1 | 8/2003 | Asayama et al. | |
| 2005/0089427 A1 | 4/2005 | Riley et al. | |
| 2006/0162549 A1 | 7/2006 | Wang | |
| 2006/0292016 A1 | 12/2006 | Hitter et al. | |
| 2008/0286120 A1 | 11/2008 | Noord | |
| 2010/0040486 A1 | 2/2010 | Kellar et al. | |
| 2012/0291920 A1 | 11/2012 | Grisley | |
| 2013/0039789 A1 | 2/2013 | Donado-Munoz | |
| 2013/0078125 A1 | 3/2013 | Headley et al. | |
| 2013/0183173 A1 | 7/2013 | Kohli et al. | |
| 2013/0233421 A1 | 9/2013 | Furet et al. | |
| 2013/0256426 A1 | 10/2013 | Becker et al. | |
| 2013/0258426 A1 | 10/2013 | Tsumekawa | |
| 2014/0034754 A1 | 2/2014 | Thompson et al. | |
| 2014/0219819 A1 | 8/2014 | Roman et al. | |
| 2015/0159647 A1 | 6/2015 | Dille et al. | |
| 2016/0069344 A1 * | 3/2016 | Carey | F04B 53/143 417/213 |
| 2016/0186743 A1 * | 6/2016 | Thompson | F04B 53/147 92/139 |

FOREIGN PATENT DOCUMENTS

| | | |
|---|---|---|
| CN | 2262110 Y | 9/1997 |
| CN | 1070581 C | 9/2001 |
| CN | 2473348 Y | 1/2002 |
| CN | 1714236 A | 12/2005 |
| CN | 1298990 C | 2/2007 |
| CN | 201041118 Y | 3/2008 |
| CN | 201189501 Y | 2/2009 |
| CN | 101617162 A | 12/2009 |
| CN | 201827066 U | 5/2011 |
| CN | 102202802 A | 9/2011 |
| CN | 103298564 A | 9/2013 |
| CN | 103814213 A | 5/2014 |
| CN | 104265620 A | 1/2015 |
| CN | 105121867 A | 12/2015 |
| CN | 108457852 A | 8/2018 |
| CN | 111648953 A | 9/2020 |
| DE | 4327549 A1 * | 2/1995 ............. F04B 53/14 |
| EP | 2725226 A1 | 4/2014 |
| EP | 3364025 A1 | 8/2018 |
| GB | 1408095 A | 10/1975 |
| JP | 2000145577 A | 5/2000 |
| JP | 2011220223 A | 11/2011 |
| KR | 200296106 Y1 | 11/2002 |
| WO | WO9816742 A1 | 4/1998 |

(56) References Cited

FOREIGN PATENT DOCUMENTS

| WO | WO0031414 A2 | 6/2000 |
|----|----|----|
| WO | WO0134981 A1 | 5/2001 |
| WO | 03002257 A2 | 1/2003 |
| WO | 2006037671 A1 | 4/2006 |

OTHER PUBLICATIONS

First Chinese Office Action for CN Application No. 2018101541686, dated Feb. 27, 2019, pp. 27.
Second Chinese Office Action for CN Application No. 2018101541686, dated Oct. 9, 2019, pp. 36.
Third Chinese Office Action for CN Application No. 2018101541686, dated Jan. 17, 2020, pp. 9.
Extended European Search Report for EP Application No. 18157930.1, dated Jun. 29, 2018, pp. 10.
Extended European Search Report for EP Application No. 20151792.7, dated Apr. 28, 2020, pp. 11.
Extended European Search Report for EP Application No. 20163489.6, dated Apr. 21, 2020, pp. 10.
First Chinese Office Action for CN Application No. 2020100314470, dated Aug. 18, 2021, pp. 23.
Chinese Office Action Application No. 2015800634940, dated Jul. 30, 2018, 21 pages.
Chinese Office Action Application No. 2015800635074, dated Jul. 30, 2018, 31 pages.
Chinese Office Action for CN Application No. 2015800634936, dated Jan. 16, 2019, 5 pages.
Chinese Office Action for CN Application No. 2015800634936, dated May 11, 2018, 9 pages.
Communication Pursuant to Article 94(3) EPC for EP Application No. 15876252.6, dated Sep. 19, 2019, pp. 1.
Extended European Search Report for EP Application No. 15876252.6, dated Jun. 6, 2018, 10 pages.
Extended European Search Report for EP Application No. 15876263.3, dated May 29, 2018, 13 pages.
Extended European Search Report for EP Application No. 15876265.8, dated Jun. 5, 2018, 12 pages.
International Search Report and Written Opinion, for PCT Application No. PCT/US2015/068049, dated Mar. 29, 2016, 12 pages.
International Search Report and Written Opinion, for PCT Application No. PCT/US2015/068074, dated Mar. 25, 2016, 18 pages.
International Search Report and Written Opinion, for PCT Application No. PCT/US2015/068080, dated Mar. 29, 2016, 17 pages.
International Search Report or Written Opinion, for PCT Application No. PCT/US2015/06874, dated Mar. 25, 2016, 18 pages.
Second Chinese Office Action for CN Application No. 2015800634940, dated Apr. 10, 2019, pp. 10.
Second Chinese Office Action for CN Application No. 2015800635074, dated Apr. 1, 2019, pp. 16.
Communication Pursuant to Article 94(3) EP for EP Application No. 15876265.8, dated Oct. 25, 2021, pp. 7.
Third Communication Pursuant to Article 94(3) EPC for EP Application No. 15876252.6, dated Dec. 9, 2021, pp. 7.
Third Communication Pursuant to Article 94(3) EPC for EP Application No. 15876263.3, dated Dec. 7, 2021, pp. 7.
Second Communication Pursuant to Article 94(3) EPC for EP Application No. 15876252.6, dated Feb. 3, 2020, pp. 4.
Second Communication Pursuant to Article 94(3) EPC for EP Application No. 15876263.3, dated Feb. 8, 2021, pp. 7.
First Communication Pursuant to Article 94(3) EPC for EP Application No. 15876263.3, dated Sep. 3, 2020, pp. 4.
International Preliminary Report on Patentability for PCT Application No. PCT/US2015/068049, dated Jul. 13, 2017, pp. 9.
International Preliminary Report on Patentability for PCT Application No. PCT/2015068074, dated Jul. 13, 2017, pp. 15.
International Preliminary Report on Patentability for PCT Application No. PCT/US2015/068080, dated Jul. 13, 2017, pp. 15.
First Communication Pursuant to Article 94(3) EPC for EP Application No. 20151792.7, dated Feb. 28, 2022, pp. 6.
Second Chinese Office Action for CN Application No. 202010031447.0, dated Mar. 3, 2022, pp. 17.
First Chinese Office Action for CN Application No. 2020105353607, dated Aug. 16, 2021, pp. 18.

* cited by examiner

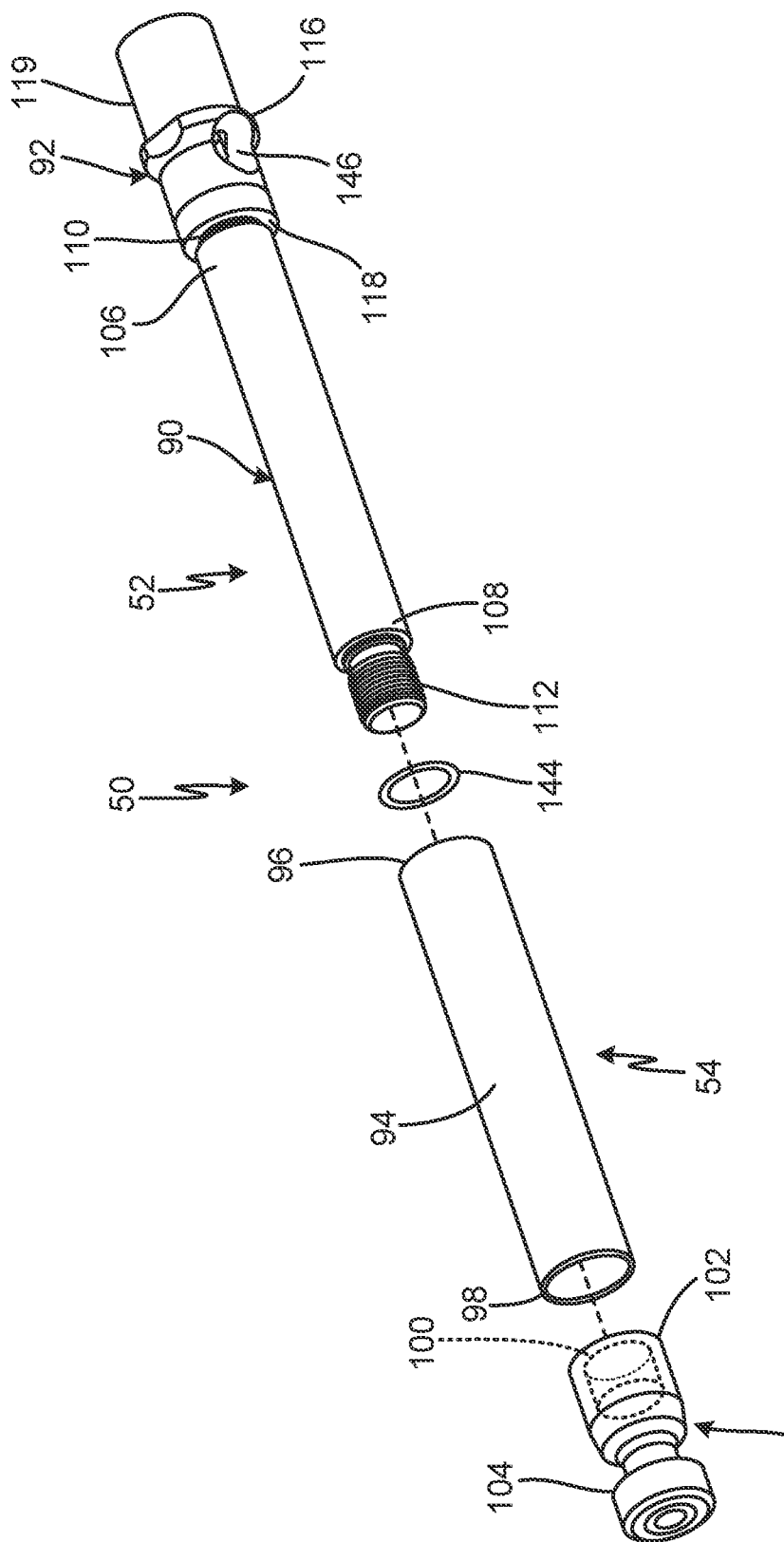

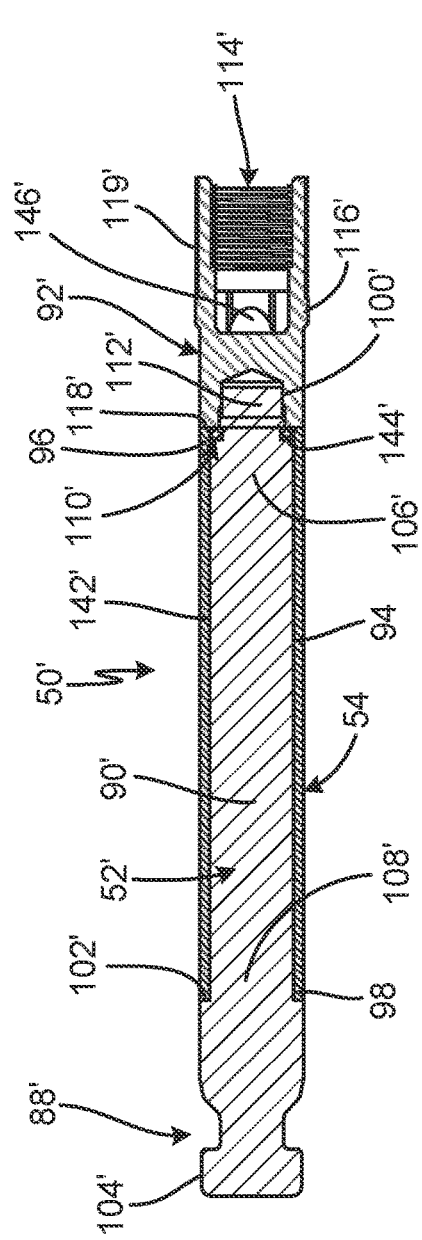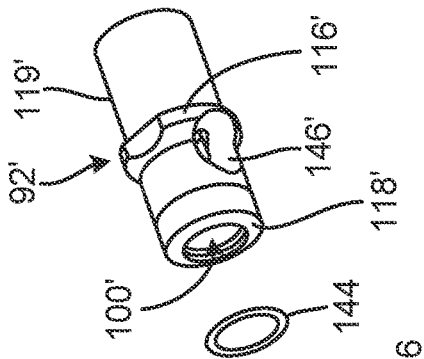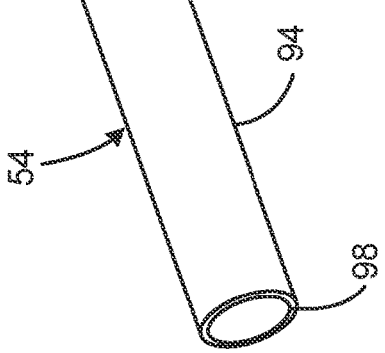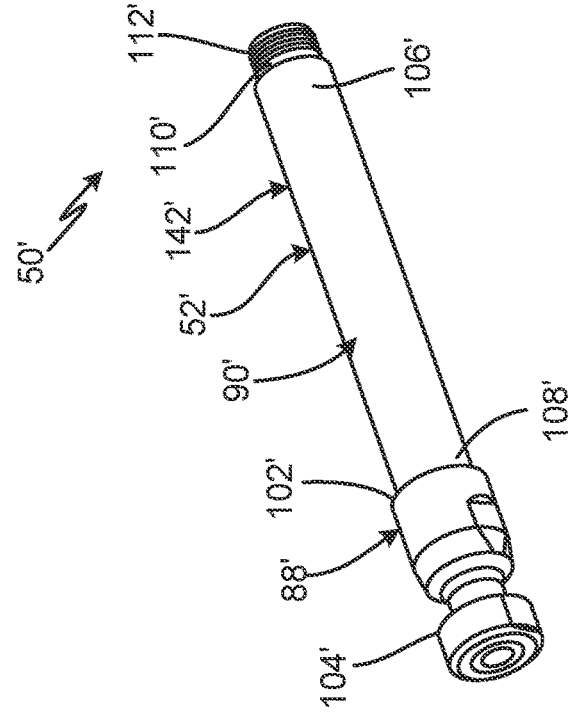

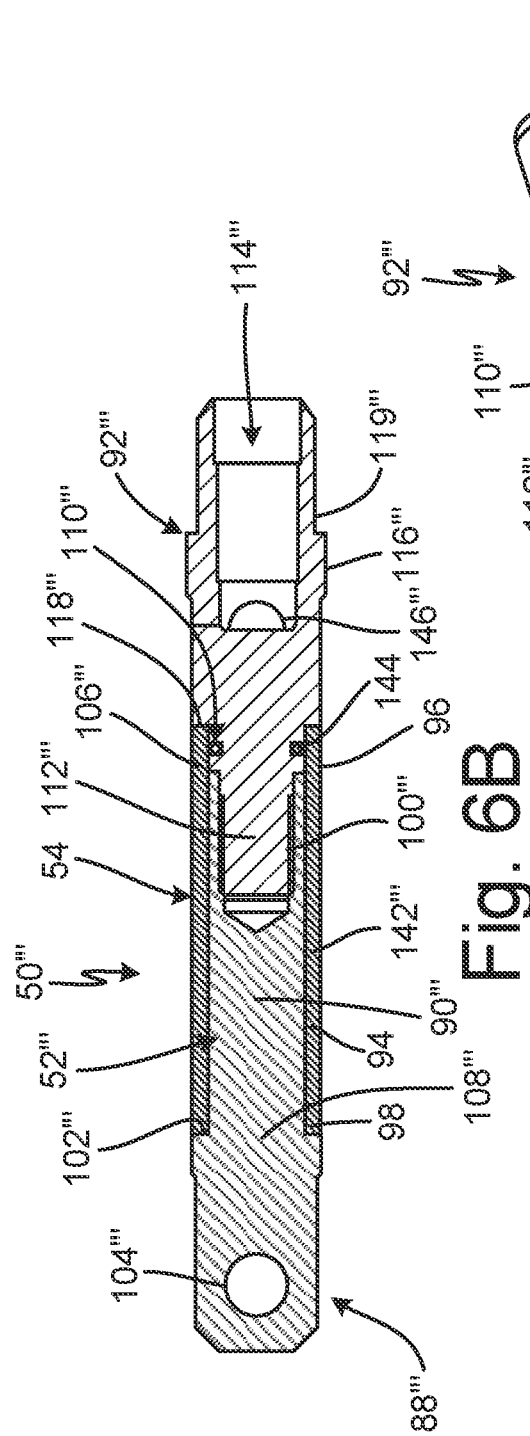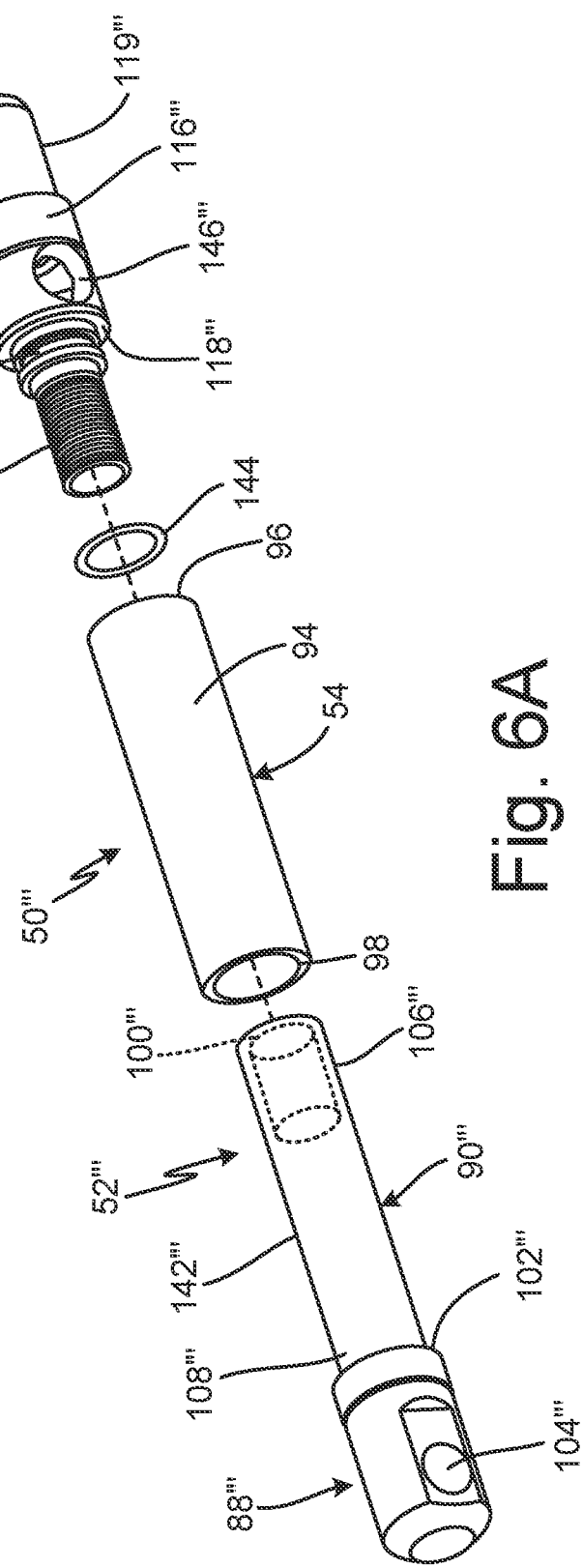

PISTON ROD ASSEMBLY FOR A FLUID PUMP

CROSS-REFERENCE TO RELATED APPLICATION(S)

This application is a continuation of U.S. application Ser. No. 16/688,621 filed Nov. 19, 2019 for "PISTON ROD ASSEMBLY FOR A PAINT PUMP" by J. D. Horning and S. J. Wrobel, which in turn claims the benefit of continuation of U.S. application Ser. No. 15/901,404 filed Feb. 21, 2018 for "REMOVABLE PISTON ROD SLEEVE FOR FLUID PUMP" by J. D. Horning and S. J. Wrobel, which in turn claims the benefit of U.S. Provisional Application No. 62/461,575 filed Feb. 21, 2017, and entitled "REMOVEABLE PISTON ROD SLEEVE FOR FLUID PUMP," the disclosures of which are hereby incorporated in their entirety.

BACKGROUND

This disclosure relates generally to piston rods. More particularly, this disclosure relates the removable wear sleeves for piston rods.

Fluid dispensing systems, such as fluid dispensing systems for paint and other solutions, typically utilize axial displacement pumps to pull a fluid from a source and to drive the fluid downstream. The axial displacement pump includes a piston that is driven in a reciprocatory manner along its longitudinal axis to pump the fluid. As the piston reciprocates, fluid is drawn into the pump and driven downstream. Displacement pumps include dynamic seals to prevent fluid from leaking around the piston. The piston can experience significant wear due to a combination of factors, such as the high pressures produced during pumping; the cyclic relative movement of the interfacing parts, such as the piston and the dynamic seal; and the abrasive nature of the fluid being pumped. Even where the piston is formed from a high-grade hardened steel, the abrasive nature of the pumped fluid and the high pressures can cause excessive wear on the piston. If the piston becomes worn, then the entire piston requires replacement.

SUMMARY

According to one aspect of the disclosure, a piston rod for a pump includes a piston rod body elongate between a first end and a second end, a piston cap connected to the first end, and a piston head connected to the second end. The piston cap includes a cap shoulder extending radially relative to the first end. The piston head includes a head shoulder extending radially relative to the second end. A cylindrical relief extends around the piston rod body between the cap shoulder and the head shoulder, and the cylindrical relief is capable of receiving a wear sleeve. The piston rod body is removably connected to at least one of the piston cap and the piston head.

According to another aspect of the disclosure, a pump includes a cylinder having an upstream end and a downstream end, a dynamic seal mounted in the cylinder, and a piston extending into the cylinder and through the first dynamic seal. The piston is configured to reciprocate within the cylinder and relative to the dynamic seal. The piston includes a piston rod body elongate between a first end and a second end, a piston cap connected to the first end and including a cap shoulder, a piston head connected to the second end and including a head shoulder, a cylindrical relief extending around the piston rod body between the cap shoulder and the head shoulder, and a wear sleeve mounted on the piston rod body within the cylindrical relief. The cap shoulder extends radially relative to the first end. The head shoulder extends radially relative to the second end. The cylindrical relief extends between the cap shoulder and the head shoulder. The piston rod body is removably connected to at least one of the piston cap and the piston head. An outer surface of the wear sleeve is the only portion of the piston contacting the dynamic seal during reciprocating pump strokes of the piston within the cylinder.

According to yet another aspect of the disclosure, a piston for a displacement pump includes a piston rod body elongate along an axis between a first end and a second end and a piston cap connected to the first end. The piston cap includes a cap body and a connecting portion extending from the cap body, wherein the connecting portion includes a cap neck extending from the cap body and a cap head connected to an opposite side of the cap neck from the cap body, and wherein the cap head is wider than the cap neck. The piston rod body is removably connected to the piston cap by a mounting portion of the piston rod body extending into a receiving portion of the cap body.

According to yet another aspect of the disclosure, a method of replacing a wear sleeve includes separating a first part of a piston rod from a second part of the piston rod; sliding a first wear sleeve off of a piston rod body of the piston rod; sliding a second wear sleeve onto the piston rod body; and clamping the second wear sleeve between an upstream shoulder of the piston rod and a downstream shoulder of the piston rod by joining the first part of the piston rod to the second part second part of the piston rod.

According to yet another aspect of the disclosure, a removable sleeve for a piston rod having a piston cap, a piston head, and a piston rod body extending between and removably connected to at least one of the piston cap and the piston head includes a first end configured to abut a cap shoulder of the piston cap; a second end configured to abut a head shoulder of the piston head; and a cylindrical sleeve body extending between the first end and the second end. The cylindrical sleeve body receives the piston rod body. The cylindrical sleeve body is formed from a ceramic.

BRIEF DESCRIPTION OF THE DRAWINGS

FIG. 3A is an exploded view of a piston.
FIG. 4A is an exploded view of a piston.
FIG. 4B is a cross-sectional view of a piston.
FIG. 6A is an exploded view of a piston.
FIG. 6B is a cross-sectional view of a piston.

DETAILED DESCRIPTION

Pumps according to the present disclosure reciprocate a piston within a cylinder to pump various fluids, examples of which include paint, water, oil, stains, finishes, aggregate, coatings, and solvents, amongst other options. A piston pump can generate high fluid pumping pressures, such as 3,000-5,000 pounds per square inch or even higher. High fluid pumping pressure is useful for atomizing the fluid into a spray for applying the fluid to a surface. The generation of high fluid pumping pressure can cause accelerated wear in the components of the pump which reciprocate relative to one another. Aspects of the present disclosure can reduce or minimize the effects of wear in a piston pump, as further discussed herein.

Figure 1A:
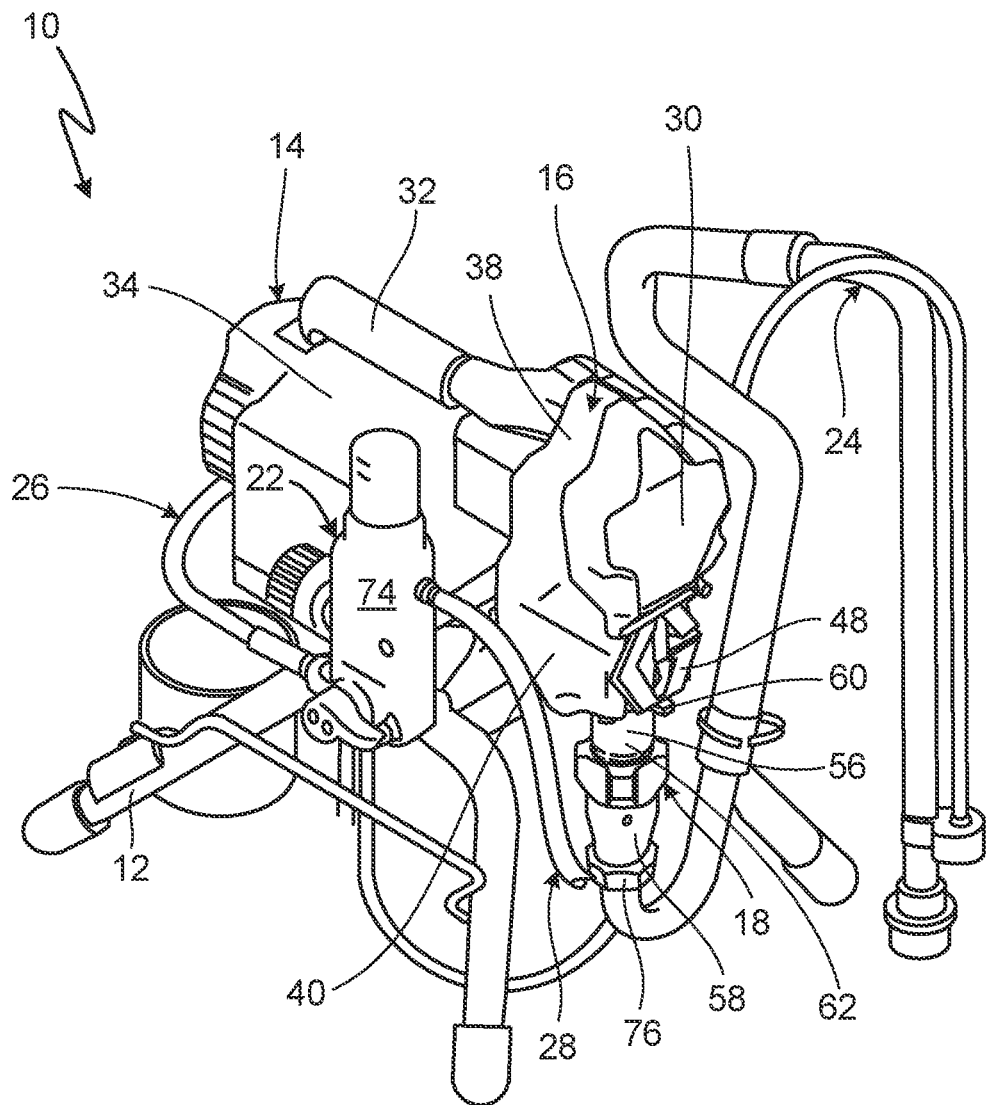
FIG. 1A is an isometric view of a fluid dispensing system.
Figure 1B:
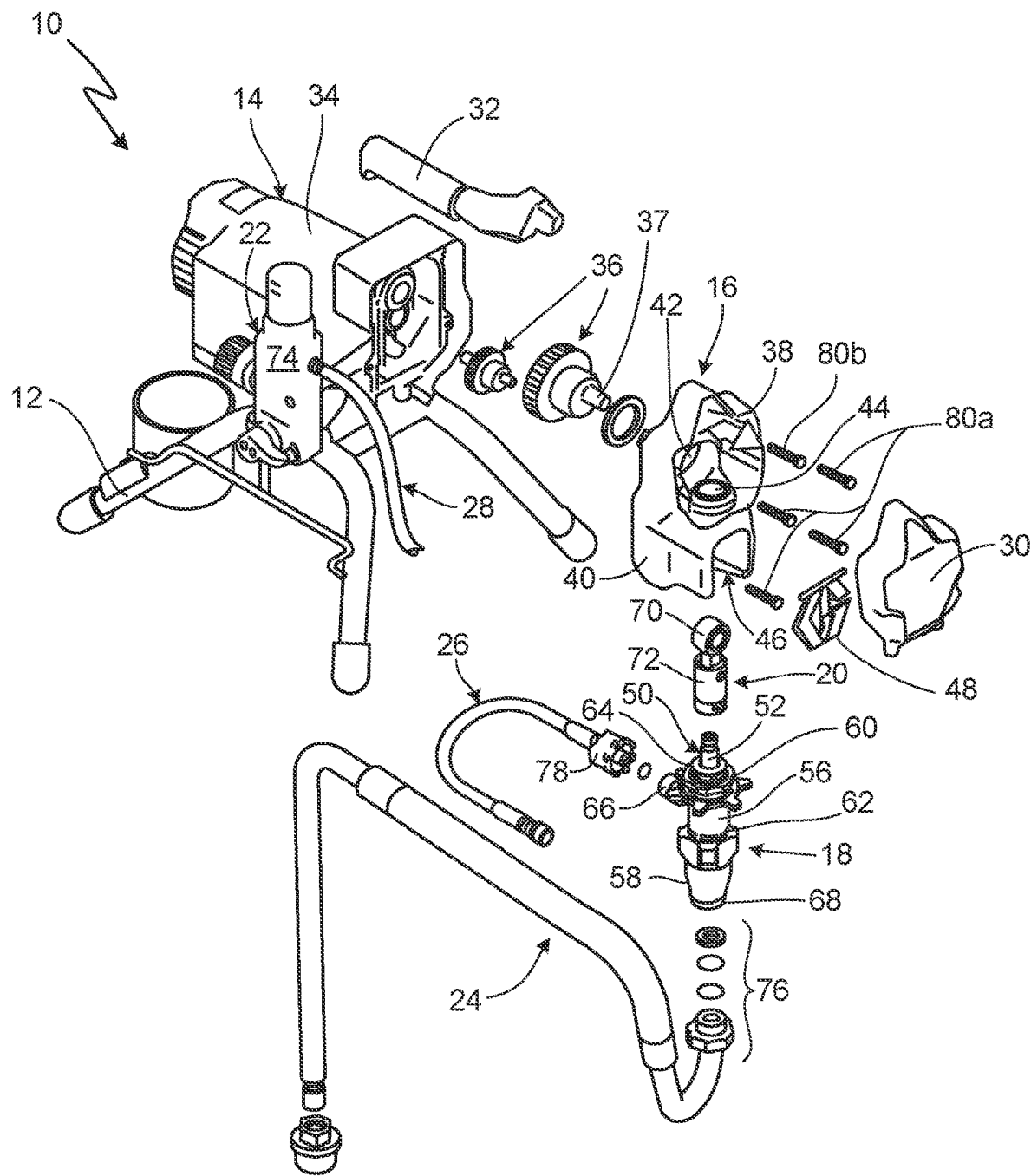
FIG. 1B is an exploded view of a fluid dispensing system.

FIG. 1A is an isometric view of fluid dispensing system 10. FIG. 1B is an exploded view of fluid dispensing system 10. FIGS. 1A and 1B will be discussed together. Fluid dispensing system 10 includes frame 12, motor section 14, drive housing 16, displacement pump 18, reciprocating drive 20 (FIG. 1B), control system 22, intake hose 24, supply hose 26, dispensing hose 28, housing cover 30, and handle 32. As shown in FIG. 1B, motor section 14 includes motor housing 34 and drive gears 36, and drive gear 36 includes eccentric drive pin 37. Drive housing 16 includes upper portion 38 and lower portion 40. Upper portion 38 includes gear aperture 42 and link aperture 44. Lower portion 40 includes mounting cavity 46 and guard 48. As shown in FIG. 1B, displacement pump 18 includes piston 50 (which includes piston rod 52 and wear sleeve 54 (shown in FIGS. 2B-6B)), cylinder 56, intake housing 58, and clamp 60. Cylinder 56 includes upstream end 62, downstream end 64, and outlet port 66. Intake housing 58 includes inlet port 68. Reciprocating drive 20 includes connecting rod 70 and drive link 72. Control system 22 includes control housing 74. Intake hose 24 includes intake fitting 76, and supply hose 26 includes supply fitting 78.

Frame 12 supports motor section 14, and drive housing 16 is mounted to motor section 14. Fasteners 80a (FIG. 1B) extend through drive housing 16 and into motor section 14 to secure drive housing 16 to motor section 14. Handle 32 is attached to drive housing 16 by fastener 80b (FIG. 1B), which extends through drive housing 16 and into handle 32. Housing cover 30 is attached to and encloses upper portion 38 of drive housing 16. Drive gears 36 are disposed within motor section 14 and extend into upper portion 38 of drive housing 16 through gear aperture 42. Drive gears 36 are driven by a motor (not shown) disposed within motor housing 34. Eccentric drive pin 37 extends into upper portion 38 and is configured to engage connecting rod 70. Any desired motor can be utilized to power drive gears 36. For example, fluid dispensing system 10 can be electric, pneumatic, or hydraulic powered.

Upper portion 38 of drive housing 16 is integral with lower portion 40 of drive housing 16. Gear aperture 42 extends through a rearward side of upper portion 38, and link aperture 44 extends through drive housing 16 between upper portion 38 and lower portion 40. Mounting cavity 46 extends into lower portion 40 and is configured to receive displacement pump 18. Guard 48 is mounted on lower portion 40 and is configured to cover mounting cavity 46.

Reciprocating drive 20 is disposed within drive housing 16. Drive link 72 is attached to connecting rod 70. Connecting rod 70 is disposed within upper portion 38 of drive housing, and drive link 72 extends through link aperture 44 and into mounting cavity 46. Connecting rod 70 is attached to and driven by drive gears 36 extending into upper portion 38 through gear aperture 42. Connecting rod 70 and eccentric drive pin 37 translate the rotational movement of drive gears 36 into linear movement of drive link 72.

Displacement pump 18 is at least partially disposed within mounting cavity 46 and can be secured by clamp 60. Clamp 60 extends about cylinder 56, and clamp 60 secures displacement pump 18 to lower portion 40 of drive housing 16. While displacement pump 18 is described as being secured to drive housing 16 by clamp 60 disposed on cylinder 56, it is understood that displacement pump 18 can be mounted in any suitable manner. For example, displacement pump 18 can include external threads configured to mate with threading on drive housing 16, or displacement pump 18 can be secured by a clamping mechanism integral with drive housing 16.

Intake housing 58 is attached to upstream end 62 of cylinder 56 to form a body of displacement pump 18. Piston 50 is at least partially disposed within displacement pump 18. Piston rod 52 extends into cylinder 56 through downstream end 64 of cylinder 56. An end of piston rod 52 extending out of cylinder 56 is connected to drive link 72, and drive link 72 is configured to drive piston rod 52 in a reciprocating manner. Piston rod 52 can be connected to drive link 72 in any suitable manner; for example, piston rod 52 can include a head mounted in a slot in drive link 72, or piston rod 52 can be pinned to drive link 72.

Intake hose 24 extends between a fluid source and displacement pump 18. Intake fitting 76 is connected to inlet port 68 to provide the fluid to intake housing 58. Supply hose 26 extends between outlet port 66 of cylinder 56 and control housing 74, to provide the fluid from displacement pump 18 to control housing 74. Supply fitting 78 is connected to outlet port 66 to attached supply hose 26 to displacement pump 18. Dispensing hose 28 is connected to control housing 74 and extends between control housing 74 and a dispenser (not shown), such as a spray gun. Control system 22 includes various components, such as a pressure regulator and a priming valve, utilized to set a flow rate and flow pressure, among other operational criteria, of the fluid. Dispensing hose 28 provides the fluid downstream of fluid dispensing system 10.

During operation, the motor of motor section 14 drives drive gears 36 in a rotational manner, and connecting rod 70 follows drive gears 36 due to the connection of eccentric drive pin 37 and connecting rod 70. Connecting rod 70 translates the rotational movement of drive gears 36 into linear movement of drive link 72, such that drive link 72 reciprocates through link aperture 44. Drive link 72 thereby drives piston 50 in a reciprocating manner, due to the connection of piston rod 52 and drive link 72. Driving piston 50 in a reciprocating manner causes piston 50 to draw the fluid into displacement pump 18 through intake hose 24 and intake housing 58, and to pump the fluid downstream through cylinder 56 and supply hose 26.

The fluid is drawn from an external source (e.g., a bucket) through intake hose 24 and enters displacement pump 18 through inlet port 68. The fluid is driven through displacement pump 18 by piston 50, and the fluid exits displacement pump 18 through outlet port 66 in cylinder 56. The fluid flows into supply hose 26 from outlet port 66 and flows to control housing 74. The fluid exits control housing 74 through dispensing hose 28 and flows downstream to the dispenser, where the fluid can be dispensed for any desired purpose, such as applying paint to a surface with a spray gun. Displacement pump 18 thus draws the fluid from a container through intake hose 24, drives the fluid downstream to control system 22 through supply hose 26, and drives the fluid through dispensing hose 28 and to a dispenser where the fluid is applied in any desired manner.

Figure 2A:
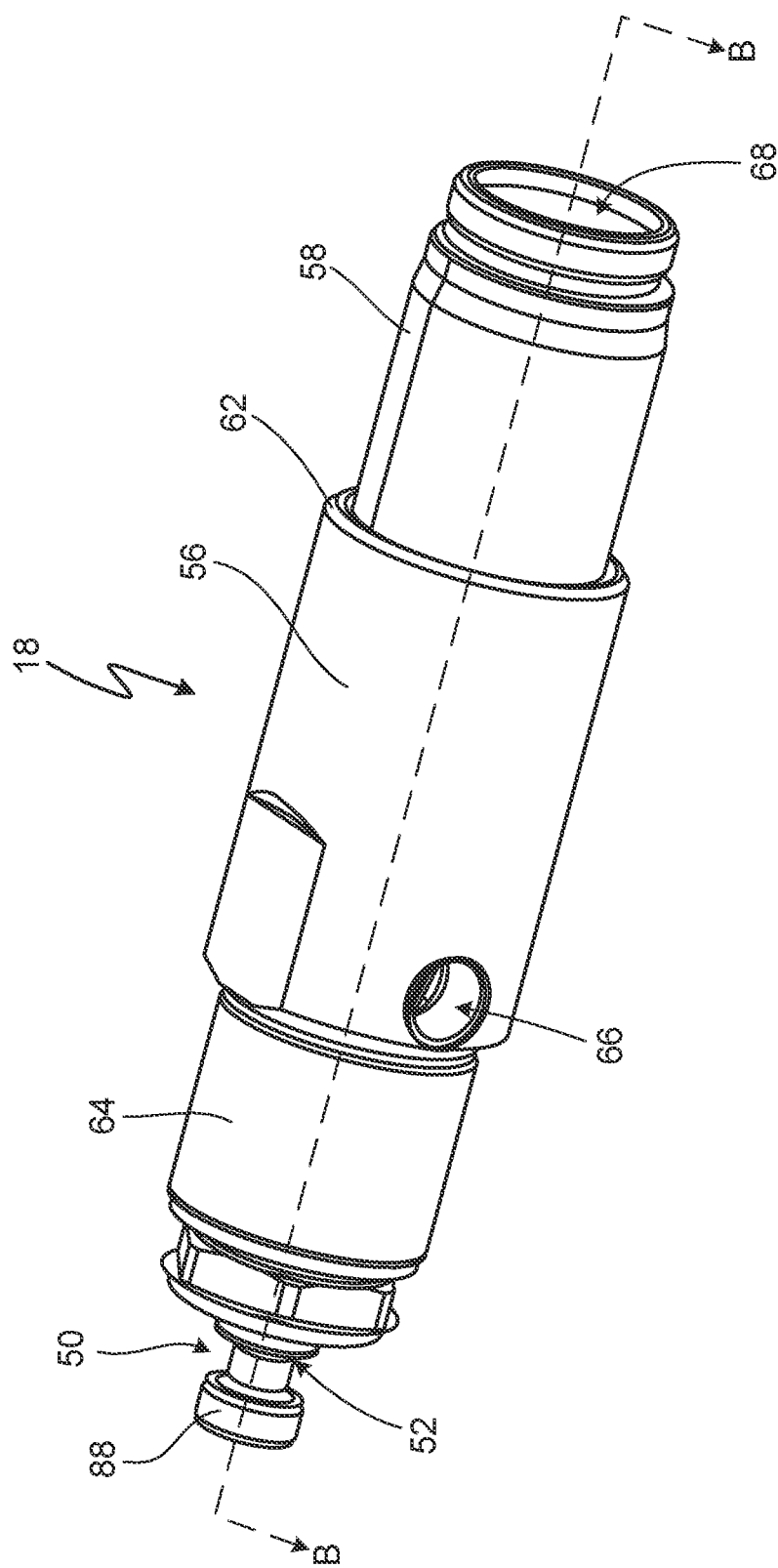
FIG. 2A is an isometric view of a displacement pump.
Figure 2B:
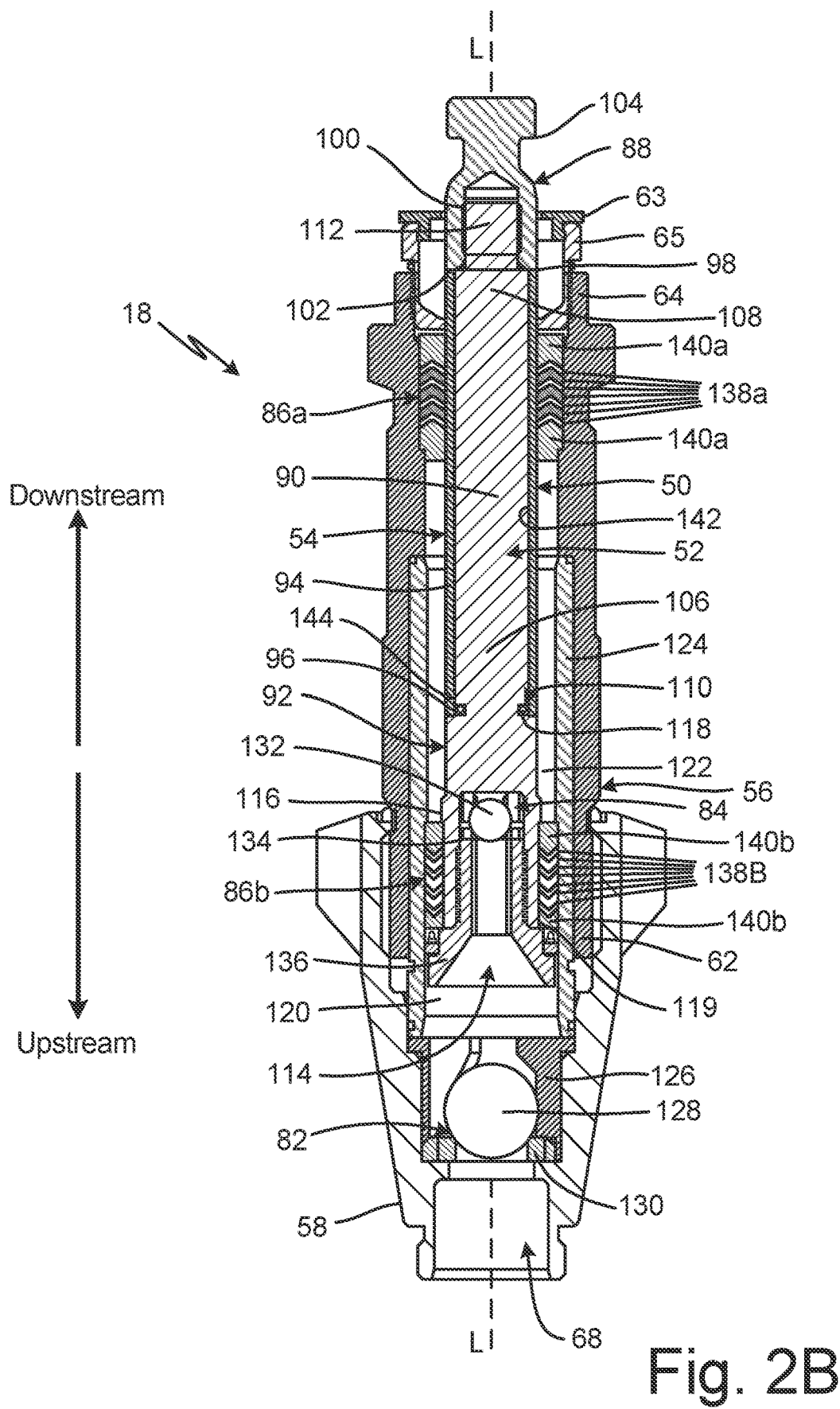
FIG. 2B is a cross-sectional view of the displacement pump of FIG. 2A taken along line B-B shown in FIG. 2A.

FIG. 2A is an isometric view of displacement pump 18. FIG. 2B is a cross-sectional view of displacement pump 18 taken along line B-B in FIG. 2A. Displacement pump 18 includes piston 50, cylinder 56, intake housing 58, first check valve 82, second check valve 84, first dynamic seal

86a, and second dynamic seal 86b. Piston 50 includes piston rod 52 and wear sleeve 54. Piston rod 52 includes piston cap 88, piston rod body 90, and piston head 92. Wear sleeve 54 includes sleeve body 94, first end 96, and second end 98. Piston cap 88 includes socket 100, cap shoulder 102, and connecting portion 104. Piston rod body 90 includes upstream end 106, downstream end 108, seal groove 110, and shank 112. Piston head 92 includes central bore 114, flange 116, head shoulder 118, and relief 119. Cylinder 56 includes outlet port 66 (shown in FIG. 2A), first fluid chamber 120, second fluid chamber 122, and inner cylinder portion 124. Intake housing 58 includes inlet port 68. First check valve 82 includes cage 126, first ball 128, and first seat 130. Second check valve 84 includes second ball 132, second seat 134, and retainer 136. Dynamic seal 86a includes packing rings 138a and seal glands 140a, and dynamic seal 86b includes packing rings 138b and seal glands 140b. A generally downstream direction is indicated by downstream arrow, and a generally upstream direction is indicated by upstream arrow.

Intake housing 58 is mounted to cylinder 56. Outlet port 66 extends through cylinder 56. Piston 50 is at least partially disposed within cylinder 56. Piston 50 extends along longitudinal axis L-L, with longitudinal axis L-L oriented coaxially with the generally elongate profile of displacement pump 18. Piston rod 52 extends into cylinder 56 through cap 63 and packing nut 65. Piston rod 52 is elongate along longitudinal axis L-L. Piston rod 52 can be formed from any suitably durable material for withstanding the high pressures associated with pumping. For example, piston rod 52 can be machined or cast from steel, brass, aluminum, or any other suitable metal. In some examples, piston rod 52 can be formed from hardened 440C stainless steel. The components of piston rod 52, such as piston cap 88, piston rod body 90, and piston head 92, can be fabricated separately.

First check valve 82 is mounted in intake housing 58. Ball cage 126 is disposed within intake housing 58, and first ball 128 is disposed within ball cage 126. In some examples, ball cage 126 is molded from a polymer, but it is understood that ball cage 126 can be formed from any suitably durable material for retaining first ball 128 through repetitive oscillation cycles. First seat 130 is disposed between ball cage 126 and inlet port 68 of intake housing 58. Second check valve 84 is disposed within central bore 114 of piston head 92. Retainer 136 engages an interior surface of piston head 92, such as with threading, to secure second seat 134 within piston head 92. In some examples, second seat 134 is integrally formed on the downstream end of retainer 136. Second ball 132 is disposed within piston head 92. Second seat 134 and retainer 136 are fixed relative to piston head 92. First ball 128 and second ball 132 can be formed from stainless steel or any other suitable material for forming a seal with first seat 130 and second seat 134, respectively. First seat 130 and second seat 134 can be formed from a high-strength material, such as tungsten carbide.

Dynamic seal 86a is disposed between cylinder 56 and piston rod 52. Cap 63 and packing nut 65 are attached to downstream end 108 of cylinder 56 and retain dynamic seal 86a within cylinder 56. Packing rings 138a are retained on cylinder 56 such that dynamic seal 86a remains stationary with respect to cylinder 56 as piston 50 reciprocates relative to cylinder 56 during operation. Wear sleeve 54 is located along the portion of piston rod 52 that overlaps, along longitudinal axis L-L, with packing rings 138a throughout the full extent of the reciprocating movement of piston 50. Packing rings 138a surround and tightly interface with wear sleeve 54 to create a seal about piston 50, thereby preventing the pumped fluid from leaking out of downstream end 108 of cylinder 56. Packing rings 138a are held between seal glands 140a. Seal glands 140a can be metallic retaining rings, among other options. Packing rings 138a can be formed from leather, polymer, and/or any other suitable sealing material.

Dynamic seal 86b is located on and around relief 119 on piston head 92 and provides a fluid seal between piston head 92 and cylinder 56. Packing rings 138b are mounted on piston head 92 and are retained by seal glands 140b. Flange 116 extends radially from piston head 92 and is disposed at a downstream end of dynamic seal 86. Flange 116 prevents the downstream seal gland 140b, and thus packing rings 138b, from moving in the downstream direction relative to piston rod 52. Retainer 136 supports the upstream seal gland 140b to prevent seal gland 140b, and thus packing rings 138b, from moving in an upstream direction relative to piston rod 52. Dynamic seal 86b divides cylinder 56 into first fluid chamber 120 and second fluid chamber 122. In the example shown, dynamic seal 86b reciprocates with piston rod 52 relative to cylinder 56. It is understood, however, that dynamic seal 86b can be mounted on cylinder 56 such that dynamic seal 86b remains stationary with respect to cylinder 56 as piston rod 52 reciprocates relative to dynamic seal 86b. Seal glands 140b can be metallic retaining rings, among other options. Packing rings 138b can be formed from leather, polymer, and/or any other suitable sealing material. While displacement pump 18 is illustrated as including two dynamic seals 86, it is understood that displacement pump 18 can include any number of dynamic seals 86. Moreover, while dynamic seals 86 are shown as including a stack of packing rings 138, it is understood that dynamic seals 86 can be of any desired configuration, such as single polymer rings that fit around piston rod 52 within cylinder 56, and that includes inner and/or outer projecting ribs that engage and seal with the outer surface of piston rod 52 and/or inner cylinder portion 124 of cylinder 56.

Piston rod body 90 extends between piston cap 88 and piston head 92. Socket 100 extends into piston cap 88. Shank 112 extends from downstream end 108 of piston rod body 90 and into socket 100. Shank 112 is received in socket 100 to removably connect piston rod body 90 and piston cap 88. In some examples, socket 100 includes internal threading and shank 112 includes external threading configured to mate with the internal threading to connect piston rod body 90 and piston cap 88. It is understood, however, that piston rod body 90 and piston cap 88 can be connected in any desired manner that allows for piston cap 88 to be removed from piston rod body 90. For example, a bore can extend through piston cap 88 and shank 112, and a pin can be received in the bore to secure shank 112 within socket 100. Piston head 92 is unitary with piston rod body 90, such that piston head 92 and piston rod body 90 are formed from a single part. It is understood, however, that both piston head 92 and piston cap 88 can be removably connected to piston rod body 90 such that piston rod 52 is formed from three separable components. Connecting portion 104 of piston cap 88 is configured to connect to a driving mechanism, such as reciprocating drive 20, to facilitate reciprocating motion of piston 50. Cap shoulder 102 is a portion of piston cap 88 extending radially relative to piston rod body 90. Head shoulder 118 is a portion of piston head 92 extending radially relative piston rod body 90. Cap shoulder 102 and head shoulder 118 define cylindrical relief 142 extending around piston rod body 90. While the terms head shoulder 118 and cap shoulder 102 are used herein, it is understood that the cap shoulder 102 and head shoulder 118 are not necessarily integral with piston cap 88 and piston head 92, respectively. Cap shoulder 102 and head shoulder 118 can refer to any two shoulders respectively closer to piston cap 88 and piston head 92 for retaining wear sleeve 54. Any reference to cap shoulder 102 can be replaced with the terms first shoulder and/or downstream shoulder, and any reference to head shoulder 118 can be replaced with the terms second shoulder and/or upstream shoulder.

Wear sleeve 54 is tubular and is disposed on piston rod body 90. Wear sleeve 54 is coaxially aligned with piston rod 52, and specifically with piston rod body 90. Wear sleeve 54 is disposed in cylindrical relief 142 and is secured on piston rod body 90 by head shoulder 118 and cap shoulder 102. First end 96 of wear sleeve 54 abuts head shoulder 118, and second end 98 of wear sleeve 54 abuts cap shoulder 102. In the example shown, the inner surface of wear sleeve 54 contacts the radially outer surface of piston rod body 90 along a full length of sleeve body 94. It is understood, however, that a central portion of piston rod body 90 can have a reduced diameter such that a chamber is formed between the sleeve body 94 and piston rod body 90. In such an example, downstream end 108 and upstream end 106 of piston rod body 90 are sized to maintain contact with sleeve body 94, while the chamber extends between upstream end 106 and downstream end 108, thereby ensuring concentricity of wear sleeve 54 and piston rod body 90. With wear sleeve 54 mounted on piston rod 52, piston 50 has a uniform outer diameter along longitudinal axis L-L between piston cap 88, wear sleeve 54, and piston head 92.

Wear sleeve 54 can be formed from a different material than piston rod 52. For example, wear sleeve 54 can be formed from metal or ceramic, among other options. Wear sleeve 54 can also be hardened prior to use. In some examples, wear sleeve 54 is formed from yttria stabilized zirconia, aluminum oxide, tungsten carbide, and silicon nitride, among other options. Wear sleeve 54 can thus be formed from a material that is harder than the metal of piston rod 52 such that wear sleeve 54 is better able to withstand the abrasive forces experienced during pumping. With wear sleeve 54 being the only component of piston 50 in contact with dynamic seal 86a, piston rod 52 can be formed from a softer metal and/or can undergo less hardening than that normally required to withstand the abrasion caused during pumping.

Wear sleeve 54 is removable from piston rod 52. Piston cap 88 is detached from piston rod body 90 by rotating piston cap 88 to unscrew shank 112 from socket 100. With piston cap 88 removed, wear sleeve 54 can be pulled off of piston rod body 90. Wear sleeve 54 is installed on piston rod 52 by sliding wear sleeve 54 onto piston rod body 90 and screwing piston cap 88 onto piston rod body 90. As such, wear sleeve 54 can be quickly and efficiently replaced to provide a new wear surface for piston 50.

Seal groove 110 extends into upstream end 106 of piston rod body 90 proximate piston head 92. Seal groove 110 receives seal 144, which is disposed between piston rod body 90 and wear sleeve 54. Seal 144 prevents the pumped fluid from migrating into the space between piston rod body 90 and sleeve body 94. In some examples, seal 144 is an o-ring, such as an elastomer o-ring. It is understood, however, that seal 144 can be of any suitable configuration for preventing the pumped fluid from migrating between piston rod body 90 and sleeve body 94. For example, seal 144 can be a gasket disposed on head shoulder 118 and captured between head shoulder 118 and first end 96 of wear sleeve 54. Moreover, while seal 144 is described as disposed within seal groove 110, it is understood that seal 144 can be retained in any desired manner. For example, seal 144 can be disposed on head shoulder 118, and first end 96 of wear sleeve 54 can include a chamfer to accommodate seal 144 and maintain seal on head shoulder 118. In other examples, wear sleeve 54 can include a groove extending into sleeve body 94 for receiving seal 144.

During operation, piston 50 is driven through an upstroke and a downstroke along longitudinal axis L-L by a driving mechanism, such as reciprocating drive 20, to draw fluid into and drive fluid downstream from displacement pump 18. During the upstroke, piston 50 is drawn in the downstream direction, indicated by downstream arrow in FIG. 2B, along longitudinal axis L-L. As piston 50 moves in the downstream direction, the volume of first fluid chamber 120 increases and the volume of second fluid chamber 122 decreases, due to piston head 92 and dynamic seal 86b shifting in the downstream direction. The expanding first fluid chamber 120 experiences a vacuum condition that causes first ball 128 to shift to an open position, where first ball 128 is disengaged from first seat 130. A flowpath is thus opened through first check valve 82, and fluid is drawn into first fluid chamber 120 through inlet port 68 and first check valve 82. During the upstroke, second ball 132 is forced onto second seat 134 and forms a seal with second seat 134 to prevent fluid within second fluid chamber 122 from flowing upstream into first fluid chamber 120. As the volume of second fluid chamber 122 decreases, the fluid within second fluid chamber 122 is driven downstream through outlet port 66 in cylinder 56.

After completing the upstroke, piston 50 reverses course and is driven through the downstroke. During the downstroke piston 50 is driven in the upstream direction, indicated by the upstream arrow in FIG. 2B. During the downstroke, the volume of first fluid chamber 120 decreases and the volume of second fluid chamber 122 increases. As piston 50 changes over from the upstroke to the downstroke second ball 132 disengages from second seat 134, providing a flowpath through piston head 92 between first fluid chamber 120 and second fluid chamber 122. First ball 128 engages first seat 130, closing first check valve 82 and preventing fluid from backflowing from first fluid chamber 120 through inlet port 68. As piston 50 moves through the downstroke, the fluid within first fluid chamber 120 flows downstream to second fluid chamber 122 through retainer 136, piston head 92, second check valve 84, and piston port 146 (shown in FIGS. 3A-4B and 5B-6B). Outlet port 66 is in unobstructed fluid communication with second fluid chamber 122, and as will be appreciated, fluid is driven downstream through outlet port 66 during both the upstroke and the downstroke of piston 50.

During both the upstroke and the downstroke dynamic seals 86 prevent fluid and air from flowing between the inner surface of cylinder 56 and the outer surface of piston 50. Both dynamic seals 86 are tightly toleranced to build the vacuum condition in first fluid chamber 120 and second fluid chamber 122, and to apply positive pressure during the reciprocation cycle of piston 50. Wear sleeve 54 is the only portion of piston 50 that contacts dynamic seal 86a during reciprocation of piston 50. As such, wear sleeve 54 prevents any portion of dynamic seal 86a from contacting any portion of piston rod 52, including piston cap 88, piston rod body 90, and piston head 92. Wear sleeve 54 thus protects piston rod 52 from experiencing wear caused by relative movement at the interface of piston rod 52 and dynamic seal 86a.

Wear sleeve 54 provides significant advantages. Wear sleeve 54 experiences all of the abrasive forces caused by reciprocating movement of piston 50 relative to dynamic seal 86a. With wear sleeve 54 being the only portion of piston 50 experiencing wear generated by dynamic seal 86a during reciprocation, piston rod 52 can be formed from a softer metal and/or can undergo less hardening, thereby reducing manufacturing costs. Moreover, wear sleeve 54 can easily be removed and replaced on piston rod 52 by unscrewing piston cap 88 from piston rod body 90, pulling wear sleeve 54 off of piston rod body 90, and replacing a new wear sleeve 54 on piston rod body 90. Wear sleeve 54 being removable saves costs and decreases downtime that would previously be required to replace a worn piston 50. In particularly abrasive environments, wear sleeve 54 can be made of a suitably sturdy, yet cheap, material to facilitate multiple replacements throughout the pumping process while utilizing a single piston 50.

Figure 3B:
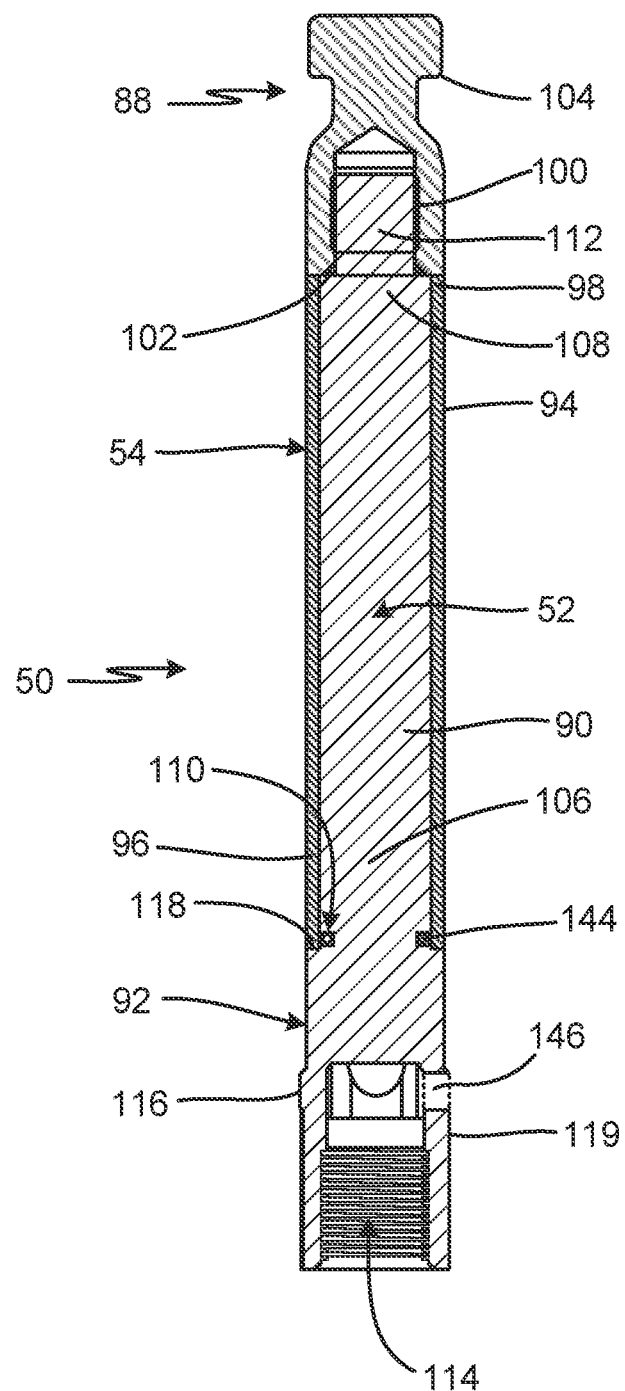
FIG. 3B is a cross-sectional view of a piston.

FIG. 3A is an exploded view of piston 50. FIG. 3B is a cross-sectional view of piston 50. FIGS. 3A and 3B will be discussed together. Piston 50 includes piston rod 52 and wear sleeve 54. Piston rod 52 includes piston cap 88, piston rod body 90, and piston head 92. Wear sleeve 54 includes sleeve body 94, first end 96 and second end 98. Piston cap 88 includes socket 100, cap shoulder 102, and connecting portion 104. Piston rod body 90 includes upstream end 106, downstream end 108, seal groove 110, and shank 112. Piston head 92 includes central bore 114, flange 116, head shoulder 118, and piston port 146.

Piston rod body 90 is unitary with and extends longitudinally from piston head 92. Central bore 114 extends into piston head 92 and is configured to receive a check valve, such as second check valve 84 (shown in FIGS. 2B and 4). Piston port 146 extends through piston head 92 and provides a flowpath for fluid to flow downstream out of piston head 92. Flange 116 extends radially from piston head 92 and is configured to support a seal, such as dynamic seal 86b (shown in FIGS. 2B and 4) mounted around relief 119. Head shoulder 118 extends radially from piston head 92 relative to piston rod body 90 and is disposed proximate upstream end 106 of piston rod body 90. Seal groove 110 extends into upstream end 106 of piston rod body 90. Seal groove 110 receives seal 144.

Shank 112 extends from downstream end 108 of piston rod body 90 and is configured to engage socket 100. Shank 112 is secured within socket 100 to attach piston rod body 90 to piston cap 88. Connecting portion 104 extends from piston cap 88 and is configured to interface with a driving mechanism, such as reciprocating drive 20 (shown in FIG. 1B), to facilitate reciprocating movement of piston 50. Cap shoulder 102 extends radially from piston cap 88 relative to piston rod body 90. In some examples, shank 112 includes external threading configured to mate with internal threading in socket 100. In other examples, a bore extends through shank 112 and socket 100 and the bore is configured to receive a pin to secure shank 112 within socket 100, thereby connecting piston cap 88 and piston rod body 90.

Cap shoulder 102 and head shoulder 118 define cylindrical relief 142, which extends axially along the length of piston rod body 90 between piston cap 88 and piston head 92. Wear sleeve 54 is disposed on piston rod body 90 in cylindrical relief 142 and extends between piston cap 88 and piston head 92. Sleeve body 94 is cylindrical and receives piston rod body 90. With wear sleeve 54 disposed on piston rod body 90, first end 96 of wear sleeve 54 abuts head shoulder 118 and second end 98 of wear sleeve 54 abuts cap shoulder 102.

Wear sleeve 54 is secured on piston rod body 90 by head shoulder 118 and cap shoulder 102. Wear sleeve 54 covers piston rod body 90 such that piston rod body 90 is prevented from contacting abrasive wear surfaces, such as dynamic seal 86a (shown in FIGS. 2B and 4) during operation. Wear sleeve 54 is a replaceable wear component of piston 50 that increases the lifespan of piston rod 52 by preventing direct contact between piston rod 52 and dynamic seal 86a. With wear sleeve 54 mounted on piston rod 52, piston 50 has a uniform outer diameter between piston cap 88, wear sleeve 54, and piston head 92. As discussed above, wear sleeve 54 can be made from any desired material, such as metal or ceramic.

Wear sleeve 54 is mechanically secured on piston rod 52. No adhesive is utilized to secure wear sleeve 54 on piston rod 52. Mechanically securing wear sleeve 54 on piston rod 52 facilitates removal and replacement of wear sleeve 54. The clamping force exerted on wear sleeve 54 by head shoulder 118 and cap shoulder 102 secures wear sleeve 54 on piston rod 52. To remove wear sleeve 54, piston cap 88 is rotated relative to piston rod body 90 to unthread shank 112 from socket 100, and piston cap 88 is pulled off of piston rod body 90. With piston cap 88 removed, wear sleeve 54 can be pulled off of piston rod body 90. To install wear sleeve 54 on piston rod 52, wear sleeve 54 is slid onto piston rod body 90 such that shank 112 extends out of second end 98 of wear sleeve 54. Piston cap 88 is attached to piston rod body 90 by threading shank 112 into socket 100. With piston cap 88 reattached to piston rod body 90 wear sleeve 54 is secured between head shoulder 118 and cap shoulder 102.

Wear sleeve 54 provides significant advantages. Wear sleeve 54 protects piston rod 52 from experiencing wear due to moving relative to dynamic seal 86a. With wear sleeve 54 experiencing all wear caused by dynamic seal 86a, piston rod 52 can be manufactured from a softer metal and/or can undergo less hardening, thereby saving manufacturing costs. In addition, wear sleeve 54 is replaceable, thereby extending the useful life of piston rod 52 by allowing the user to replace wear sleeve 54 and continue using the same piston rod 52, which saves replacement costs. Wear sleeve 54 is retained on piston rod body 90 by head shoulder 118 and cap shoulder 102 without the use of adhesives, which facilitates quick and efficient removal and replacement of wear sleeve 54.

FIG. 4A is an exploded view of piston 50'. FIG. 4B is a cross-sectional view of piston 50'. Piston 50' includes piston rod 52' and wear sleeve 54. Piston rod 52' includes piston cap 88', piston rod body 90', and piston head 92'. Wear sleeve 54 includes sleeve body 94, first end 96 and second end 98. Piston cap 88' includes cap shoulder 102' and connecting portion 104'. Piston rod body 90' includes upstream end 106', downstream end 108', seal groove 110', and shank 112'. Piston head 92' includes socket 100', central bore 114', flange 116', head shoulder 118', relief 119', and piston port 146'.

Piston rod body 90' is unitary with and extends longitudinally from piston cap 88'. Connecting portion 104' extends from piston cap 88' and is configured to engage a driving member, such as reciprocating drive 20 (shown in FIG. 1B), to facilitate reciprocating movement of piston 50'. Cap shoulder 102' extends radially from piston cap 88' relative to piston rod body 90' and is disposed proximate downstream end 108' of piston rod body 90'. Shank 112' extends from upstream end 106' of piston rod body 90' and includes external threading. Seal groove 110' extends into upstream end 106' of piston rod body 90' proximate shank 112', and seal groove 110' receives seal 144. Seal 144 can be any suitable seal for preventing fluid from migrating into the interface between wear sleeve 54 and piston rod body 90'. For example, seal 144 can be an elastomer o-ring.

Socket 100' extends into a downstream end of piston head 92' and central bore 114' extends into an upstream end of piston head 92'. Socket 100' includes internal threading configured to mate with external threading on shank 112' to attach piston head 92' and piston rod body 90'. Piston port 146' extends through piston head 92' and is in fluid communication with central bore 114'. Piston port 146' provides a flowpath for fluid to flow downstream out of piston head 92'. Flange 116' extends radially from piston head and is configured to support a seal, such as dynamic seal 86b (shown in FIGS. 2B and 5A) mounted around relief 119'. Head shoulder 118' is formed on a portion of piston head 92' extending radially relative to piston rod body 90'.

Cap shoulder 102' and head shoulder 118' define cylindrical relief 142', which extends along the length of piston rod body 90' between piston cap 88' and piston head 92'. Wear sleeve 54 is disposed in cylindrical relief 142' and extends between piston cap 88' and piston head 92'. Sleeve body 94 is cylindrical and surrounds piston rod body 90'. First end 96 of wear sleeve 54 abuts head shoulder 118' and second end 98 of wear sleeve 54 abuts cap shoulder 102'. With wear sleeve 54 mounted on piston rod 52', piston 50' has a uniform outer diameter between piston cap 88', wear sleeve 54, and piston head 92'. Wear sleeve 54 covers piston rod body 90' such that piston rod body 90' is prevented from contacting abrasive wear surfaces, such as dynamic seal 86a, as piston 50' reciprocates during operation. Wear sleeve 54 is a replaceable wear component of piston 50' that increases the lifespan of piston rod 52'. As discussed above, wear sleeve 54 can be made from any desired material, such as metal or ceramic.

Wear sleeve 54 is mechanically secured on piston rod 52' by a clamping force exerted on wear sleeve 54 by head shoulder 118' and cap shoulder 102'. No adhesive is utilized to secure wear sleeve 54 on piston rod 52'. Mechanically securing wear sleeve 54 facilitates removal and replacement of wear sleeve 54. To remove wear sleeve 54, piston head 92' is rotated relative to piston rod body 90' to unthread shank 112' from socket 100'. Piston head 92' is pulled off of piston rod body 90'. With piston head 92' removed, wear sleeve 54 is pulled off of piston rod body 90'. To install wear sleeve 54 on piston rod 52', wear sleeve 54 is slid onto piston rod body 90' such that shank 112' extends out of first end 96 of wear sleeve 54. Piston head 92' is attached to piston rod body 90' by threading shank 112' into socket 100'. With piston head 92' reattached to piston rod body 90', wear sleeve 54 is secured between head shoulder 118' and cap shoulder 102'.

Figure 5A:
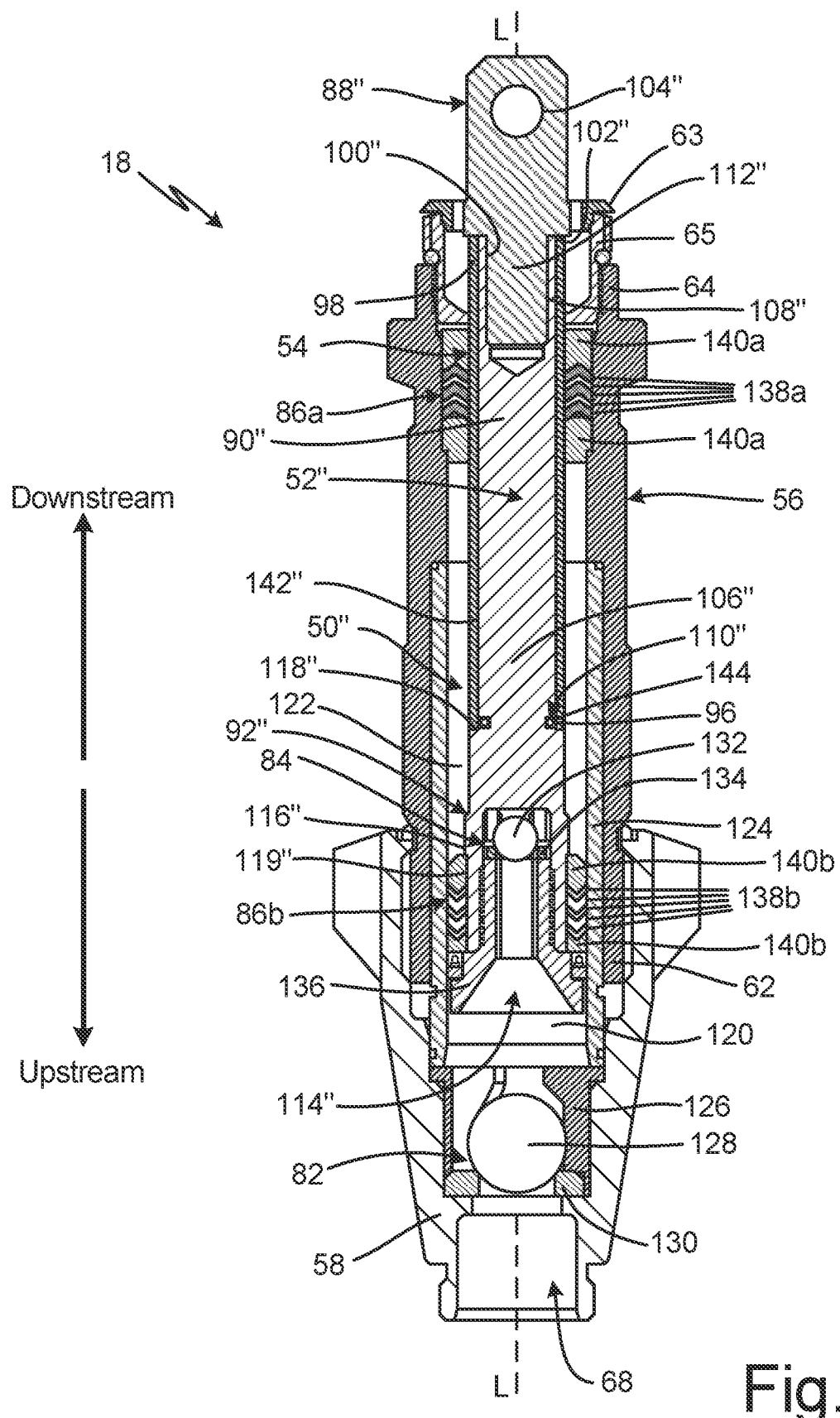
FIG. 5A is a cross-sectional view of a displacement pump.
Figure 5B:
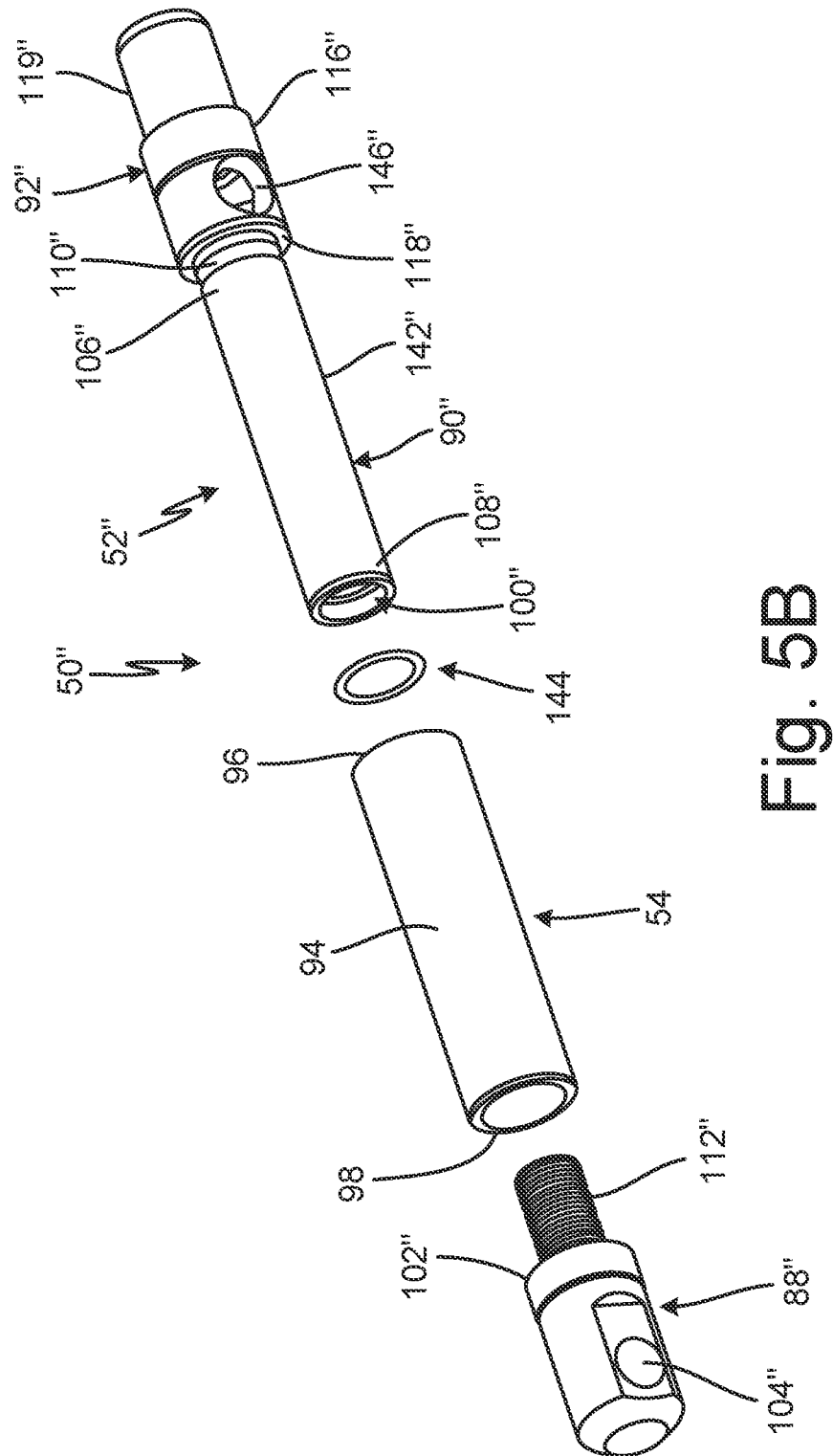
FIG. 5B is an exploded view of a piston.
Figure 5C:
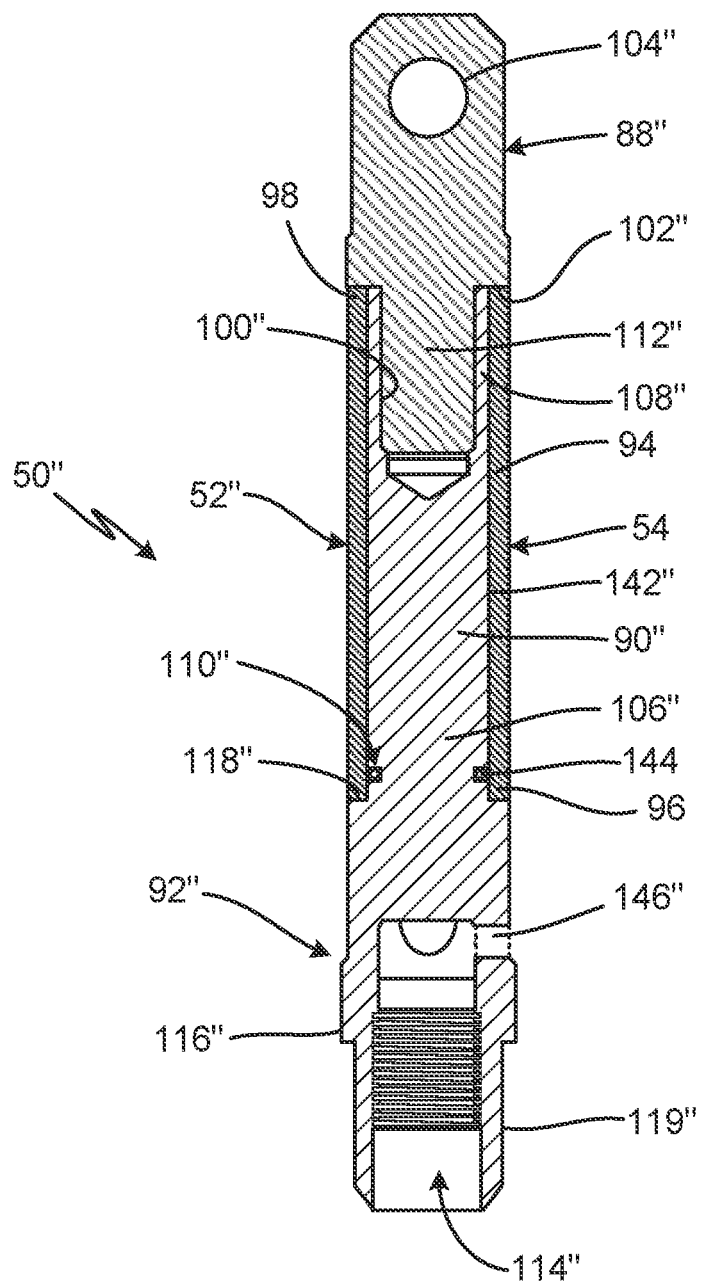
FIG. 5C is a cross-sectional view of a piston.

FIG. 5A is a cross-sectional view of displacement pump 18 including piston 50". FIG. 5B is an exploded view of piston 50". FIG. 5C is a cross-sectional view of piston 50". FIGS. 5A-5C will be discussed together. Displacement pump 18 is functionally similar to displacement pump 18 shown in FIGS. 2A-2B. As such, like numbers are used to describe like parts and the operation and arrangement of the like parts will not be discussed in detail.

Piston 50" includes piston rod 52" and wear sleeve 54. Piston rod 52" includes piston cap 88", piston rod body 90", and piston head 92". Wear sleeve 54 includes sleeve body 94, first end 96, and second end 98. Piston cap 88" includes cap shoulder 102", connecting portion 104", and shank 112". Piston rod body 90" includes socket 100", upstream end 106", downstream end 108", and seal groove 110". Piston head 92" includes central bore 114", flange 116", head shoulder 118", relief 119", and piston port 146".

Piston 50" extends along longitudinal axis L-L and is configured to drive fluid through displacement pump 18. Piston rod 52" extends into cylinder through cap 63 and packing nut 65 and is elongate along longitudinal axis L-L. Piston rod 52" can be formed from any suitably durable material for withstanding the high pressures associated with pumping. For example, piston 50" can be machined or cast from steel, brass, aluminum, or any other suitable metal. In some examples, piston 50" can be formed from hardened 440C stainless steel.

Shank 112" extends from piston cap 88" and is received within socket 100". In some examples, socket 100" includes internal threading and shank 112" includes external threading configured to mate with the internal threading in socket 100" to secure piston cap 88" to piston rod body 90". In other examples, a bore can extend through socket 100" and shank 112", and the bore can receive a pin to secure piston cap 88" to piston rod body 90". As such, piston cap 88" is removably connected to piston rod body 90". Connecting portion 104" of piston cap 88" is configured to connect piston 50" to a driving mechanism that drives the reciprocating motion of piston 50" during operation. As shown, connecting portion 104" includes an aperture for receiving a pin that is driven in a reciprocating manner by a drive, such as reciprocating drive 20 (shown in FIG. 2B), to facilitate reciprocation of piston 50". Cap shoulder 102" extends radially from piston cap 88" relative to piston rod body 90".

Piston rod body 90" is unitary with piston head 92" and is elongate along longitudinal axis L-L. Socket 100" extends into downstream end 108" of piston rod body 90" and receives shank 112". Socket 100" can include internal threading configured to mate with external threading on shank 112", such that the interfacing threads secure piston cap 88" to piston rod body 90". Seal groove 110" extends into upstream end 106" of piston rod body 90" proximate piston head 92". Seal 144 is at least partially disposed within seal groove 110". Seal 144 provides a fluid-tight seal between piston rod body 90" and wear sleeve 54 and can be of any desired configuration for preventing the pumped fluid from flowing into the interface between piston rod body 90" and sleeve body 94. In some examples, seal 144 is an o-ring, such as an elastomer o-ring. It is understood, however, that seal 144 can be of any suitable configuration for preventing the pumped fluid from migrating between piston rod body 90" and wear sleeve 54.

Head shoulder 118" extends radially from piston head 92" relative to piston rod body 90". Central bore 114" extends into an upstream end of piston head 92" and receives second check valve 84. Piston port 146" extends through piston head 92" downstream of second check valve 84, and piston port 146" provides a flowpath between central bore 114" and second fluid chamber 122, to allow the pumped fluid to flow downstream out of piston head 92". Flange 116" extends radially from piston head 92" and provides downstream support for dynamic seal 86b to prevent dynamic seal 86b from shifting downstream during reciprocation of piston 50". Dynamic seal 86b is disposed around relief 119" on piston head 92".

Head shoulder 118" and cap shoulder 102" define cylindrical relief 142", which extends along the longitudinal length of piston rod body 90". Wear sleeve 54 is disposed in cylindrical relief 142" and surrounds piston rod body 90". Sleeve body 94 is tubular and is configured to receive piston rod body 90". Wear sleeve 54 is located along the portion of piston rod 52" that overlaps, along longitudinal axis L-L, with packing rings 138a throughout the full extent of the reciprocating movement of piston rod 52". Wear sleeve 54 is coaxially aligned with piston rod 52", and specifically with piston rod body 90". First end 96 of wear sleeve 54 abuts head shoulder 118" and second end 98 of wear sleeve 54 abuts cap shoulder 102″. While the terms head shoulder 118″ and cap shoulder 102″ are used herein, it is understood that the cap shoulder 102″ and head shoulder 118″ are not necessarily integral with piston cap 88″ and piston head 92″, respectively. Cap shoulder 102″ and head shoulder 118″ can refer to any two shoulders respectively closer to piston cap 88″ and piston head 92″ for retaining wear sleeve 54. Any reference to cap shoulder 102″ can be replaced with the terms first shoulder and/or downstream shoulder, and any reference to head shoulder 118″ can be replaced with the terms second shoulder and/or upstream shoulder.

Wear sleeve 54 is mechanically secured on piston rod body 90″ by head shoulder 118″ and cap shoulder 102″. No adhesive is utilized to secure wear sleeve 54 on piston rod 52″. Mechanically securing wear sleeve 54 on piston rod body 90″ facilitates removal and replacement of wear sleeve 54. To remove wear sleeve 54 from piston rod 52″, piston cap 88″ is rotated relative to piston rod body 90″ to unthread shank 112″ from socket 100″. Piston cap 88″ is pulled away from piston rod body 90″. With piston cap 88″ removed, wear sleeve 54 is pulled off of piston rod body 90″. To install wear sleeve 54 on piston rod 52″, wear sleeve 54 is slid onto piston rod body 90″. Piston cap 88″ is attached to piston rod body 90″ by threading shank 112″ into socket 100″. With piston head 92″ reattached to piston rod body 90″, wear sleeve 54 fully encloses piston rod body 90″ and is secured between head shoulder 118″ and cap shoulder 102″.

During operation, piston 50″ reciprocates within cylinder 56 and relative to dynamic seal 86a. Wear sleeve 54 is the only portion of piston 50″ that contacts dynamic seal 86a during reciprocation of piston 50″. As such, wear sleeve 54 prevents any portion of dynamic seal 86a from contacting piston rod 52″, which include piston cap 88″, piston rod body 90″, and piston head 92″. Wear sleeve 54 experiences all of the abrasive forces generated at the interface of dynamic seal 86a and piston 50″. Wear sleeve 54 thus protects piston rod 52″ from experiencing wear caused by movement relative to dynamic seal 86a.

As discussed above, wear sleeve 54 can be formed from a different material than piston rod 52″. Piston rod 52″ is typically metallic. Wear sleeve 54 can be formed from metal or ceramic, among other options, and wear sleeve 54 can be hardened prior to use. In some examples, wear sleeve 54 is formed from yttria stabilized zirconia, aluminum oxide, tungsten carbide, and silicon nitride, among other options. Wear sleeve 54 can thus be formed from a material that is harder than the metal of piston rod 52″, such that wear sleeve 54 is better able to withstand the abrasive forces experienced during pumping. In examples where wear sleeve 54 is formed from metal, the metal of wear sleeve 54 can be different than the metal of piston rod 52″ and/or can be treated, such as heat treating, to have different properties than piston rod 52″. With wear sleeve 54 being the only component of piston 50″ in contact with dynamic seal 86a, piston rod 52″ can be formed from a softer metal and/or can undergo less hardening than that normally required to withstand the abrasion experienced during pumping. In some examples, wear sleeve 54 is made from the same material as piston rod 52″. It is understood, however, that regardless of the material that wear sleeve 54 is made from, wear sleeve 54 is the only portion of piston 50″ that interfaces with dynamic seal 86a during operation.

Wear sleeve 54 provides significant advantages. Wear sleeve 54 experiences all of the abrasive forces caused by reciprocating movement of piston 50″ relative to dynamic seal 86a. With wear sleeve 54 being the only portion of piston 50″ experiencing wear generated during reciprocation, piston rod 52″ can be formed from a softer metal and/or can undergo less hardening, thereby reducing manufacturing costs. Moreover, wear sleeve 54 can easily be removed and replaced on piston rod 52″, by unscrewing piston cap 88″ from piston rod body 90″, pulling wear sleeve 54 off of piston rod body 90″, and replacing a new wear sleeve 54 on piston rod body 90″. Wear sleeve 54 being removable saves costs and decreases downtime that would previously be required to replace a worn element of piston 50″. Wear sleeve 54 eliminates the need to replace piston rod 52″, thereby decreasing operating costs.

FIG. 6A is an exploded view of piston 50‴. Piston 50″ includes piston rod 52‴ and wear sleeve 54. Piston rod 52‴ includes piston cap 88′, piston rod body 90‴, and piston head 92‴. Wear sleeve 54 includes sleeve body 94, first end 96, and second end 98. Piston cap 88‴ includes cap shoulder 102‴ and connecting portion 104‴. Piston rod body 90‴ includes socket 100‴, upstream end 106‴, and downstream end 108‴. Piston head 92‴ includes shank 112‴, central bore 114‴, flange 116‴, head shoulder 118‴, and piston port 146‴. Shank 112‴ includes seal groove 110‴.

Piston rod body 90‴ is unitary with and extends longitudinally from piston cap 88‴. Connecting portion 104‴ is disposed on piston cap 88‴ and is configured to engage a driving member, such as reciprocating drive 20, to facilitate reciprocation of piston 50‴ during operation. In the example shown, connecting portion 104‴ includes an aperture extending therethrough that is configured to receive a pin to drive piston 50‴ in a reciprocating manner. Cap shoulder 102‴ extends radially from piston cap 88‴ relative to piston rod body 90‴. Cap shoulder 102‴ is disposed proximate downstream end 108‴ of piston rod body 90‴. Socket 100‴ extends into upstream end 106‴ of piston rod body 90‴. In some examples socket 100‴ includes internal threading.

Shank 112‴ extends from a downstream end of piston head 92‴. In some examples, shank 112‴ includes external threading configured to mate with the internal threading of socket 100‴. As such, shank 112‴ can be threaded into socket 100‴ to secure piston head 92‴ to piston rod body 90‴. Seal groove 110‴ extends circumferentially around shank 112‴. Seal 144 is at least partially disposed in seal groove 110‴. Central bore 114‴ extends into an upstream end of piston head 92‴. Piston port 146‴ extends through piston head 92‴ and is in fluid communication with central bore 114‴. Piston port 146‴ provides a flowpath for fluid to flow downstream out of piston head 92‴. Flange 116‴ extends radially from piston head and is configured to support a seal, such as dynamic seal 86b (shown in FIGS. 2B and 5A). Head shoulder 118‴ extends radially from piston head 92‴ relative to piston rod body 90‴.

Cap shoulder 102‴ and head shoulder 118‴ define cylindrical relief 142‴, which extends along the length of piston rod body 90‴ between piston cap 88‴ and piston head 92‴. Wear sleeve 54 is disposed in cylindrical relief 142‴. Sleeve body 94 is cylindrical and surround piston rod body 90‴. First end 96 of wear sleeve 54 abuts head shoulder 118‴ and second end 98 of wear sleeve 54 abuts cap shoulder 102‴. With wear sleeve 54 mounted on piston rod 52‴, piston rod 52‴ has a uniform outer diameter between piston cap 88‴, wear sleeve 54, and piston head 92‴. Wear sleeve 54 encloses piston rod body 90‴ such that piston rod body 90‴ is prevented from contacting abrasive wear surfaces, such as dynamic seal 86a, during operation. Wear sleeve 54 is a replaceable wear component of piston 50‴. As discussed above, wear sleeve 54 can be made from any desired material, such as metal or ceramic.

Wear sleeve 54 is mechanically secured on piston rod 52''' by a clamping force exerted on wear sleeve 54 by head shoulder 118''' and cap shoulder 102'''. No adhesive is utilized to secure wear sleeve 54 on piston rod 52'''. Mechanically securing wear sleeve 54 facilitates removal and replacement of wear sleeve 54. To remove wear sleeve 54 from piston rod 52''', piston head 92''' is rotated relative to piston rod body 90''', unthreading shank 112''' from socket 100'''. Piston head 92''' is pulled off of piston rod body 90'''. With piston head 92''' removed, wear sleeve 54 is pulled off of piston rod body 90'''. To install wear sleeve 54 on piston rod 52''', wear sleeve 54 is slid onto piston rod body 90'''. Piston head 92''' is attached to piston rod body 90''' by threading shank 112''' into socket 100'''. With piston head 92''' reattached to piston rod body 90''', wear sleeve 54 is secured between head shoulder 118''' and cap shoulder 102'''.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A piston for a displacement pump, the piston comprising:
   a piston rod body elongate along an axis between a first end and a second end; and
   a piston cap connected to the first end, the piston cap including a cap body, a cap neck extending from the cap body, and a cap head connected to an opposite side of the cap neck from the cap body, and wherein the cap head is wider than the cap neck and is formed as a projection extending radially from the cap neck;
   wherein the piston rod body is removably connected to the piston cap by a mounting portion of the piston rod body extending into a receiving portion of the cap body; and
   wherein a gap is formed between the cap head and the cap body and extends circumferentially around the cap neck.

2. The piston of claim 1, wherein the receiving portion is a socket formed in the cap body and the mounting portion is a shank projecting from the first end.

3. The piston of claim 2, wherein the shank includes external threads and the socket includes internal threads configured to mate with the external threads to secure the piston cap to the piston rod body.

4. The piston of claim 3, wherein the shank has a first diameter and the piston rod body has a second diameter larger than the first diameter.

5. The piston of claim 4, wherein the cap body has an outer diameter, the outer diameter larger than the second diameter.

6. The piston of claim 4, wherein a piston head is disposed at the second end of the piston rod body, the piston head having a third diameter larger than the second diameter.

7. The piston of claim 1, wherein the cap body includes a cap shoulder formed radially between the receiving portion and an exterior of the cap body such that the cap body is wider than the piston rod body.

8. The piston of claim 7, wherein the cap shoulder interfaces with the piston rod body.

9. The piston of claim 7, wherein the cap shoulder interfaces with a body shoulder formed on the piston rod body and extending between an exterior of the piston rod body and the mounting portion.

10. The piston of claim 9, wherein the receiving portion is a bore extending into the piston cap and the mounting portion is a shank extending from the piston rod body.

11. The piston of claim 10, wherein an axial depth of the bore is greater than an axial length of the shank such that an unoccupied portion of the bore remains with the cap shoulder interfacing with the body shoulder.

12. A displacement pump comprising:
   a pump body having a first body end and a second body end;
   a first dynamic seal disposed within the pump body proximate the first body end; and
   the piston of claim 1 disposed partially within the pump body and extending out of the pump body through the first body end such that the piston cap is disposed outside of the pump body, wherein the piston interfaces with the first dynamic seal at a first location along the piston such that the piston cap is disposed on an opposite side of the first dynamic seal from the second end of the piston rod body.

13. The displacement pump of claim 12, wherein a second dynamic seal is disposed within the pump body and forms a seal between the piston and the pump body at a second location spaced axially from the first location.

14. The displacement pump of claim 13, wherein the shank has a first diameter and the piston rod body has a second diameter larger than the first diameter.

15. The displacement pump of claim 14, wherein the cap body has an outer diameter, the outer diameter larger than the second diameter, and wherein a piston head is disposed at the second end of the piston rod body, the piston head having a third diameter larger than the second diameter.

16. A piston for a displacement pump, the piston comprising:
   a piston rod body elongate along an axis between a first end and a second end; and
   a piston cap connected to the first end, the piston cap including a cap body, a cap neck extending from the cap body, and a cap head connected to an opposite side of the cap neck from the cap body, and wherein the cap head is wider than the cap neck;
   wherein the piston rod body is removably connected to the piston cap by a mounting portion of the piston rod body extending into a receiving portion of the cap body;
   wherein an exterior of the piston cap is sloped between the cap body and the cap neck.

17. The piston of claim 16, wherein the piston head includes a first axial surface oriented in a first axial direction away from the cap body and a second axial surface oriented in a second axial direction towards the cap body, and wherein the second axial surface is a flat ring.

18. The piston of claim 17, wherein:
   a gap is formed axially between the cap head and the cap body and around the cap neck;
   the receiving portion is a socket formed in the cap body and having internal threads and the mounting portion is a shank projecting from the first end and having a first diameter and external threads configured to mate with the internal threads to secure the piston cap to the piston rod body;

the piston rod body has a second diameter larger than the first diameter and the cap body has an outer diameter larger than the second diameter; and the cap body includes a cap shoulder formed radially between the socket and an exterior of the cap body, the cap shoulder interfacing with a body shoulder formed on the piston rod body and extending between an exterior of the piston rod body and the mounting portion.

\* \* \* \* \*